US012686179B1

(12) United States Patent
Liu et al.

(10) Patent No.: US 12,686,179 B1
(45) Date of Patent: Jul. 21, 2026

(54) PRINTER CONTROL METHOD, PRINTER, AND COMPUTER-READABLE STORAGE MEDIUM

(71) Applicant: AtomForm Technology (Shenzhen) Co., Ltd., Shenzhen (CN)

(72) Inventors: Bin Liu, Shenzhen (CN); Jigeng Shang, Shenzhen (CN)

(73) Assignee: AtomForm Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/260,248

(22) Filed: Jul. 3, 2025

(30) Foreign Application Priority Data

Mar. 7, 2025 (CN) .......................... 202510284203.6
Jun. 20, 2025 (CN) .......................... 202510851927.4

(51) Int. Cl.
| | |
|---|---|
| *B29C 64/393* | (2017.01) |
| *B29C 64/118* | (2017.01) |
| *B33Y 10/00* | (2015.01) |
| *B33Y 50/02* | (2015.01) |

(52) U.S. Cl.
CPC .......... *B29C 64/393* (2017.08); *B29C 64/118* (2017.08); *B33Y 10/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 2022/0402213 A1 | 12/2022 | Watanabe | |
| 2023/0226770 A1 | 7/2023 | Sameshima et al. | |
| 2024/0092029 A1* | 3/2024 | Konvicný | B29C 64/393 |

FOREIGN PATENT DOCUMENTS

| | | | |
|---|---|---|---|
| CN | 105922570 A | 9/2016 | |
| CN | 110962337 A | 4/2020 | |
| CN | 112936847 A | 6/2021 | |
| CN | 119501089 A | 2/2025 | |
| CN | 119550628 A * | 3/2025 | B33Y 30/00 |
| DE | 102023203287 A1 | 10/2024 | |
| JP | H0976352 A | 3/1997 | |
| WO | 2025066439 A1 | 4/2025 | |

OTHER PUBLICATIONS

How to prevent infill marks on the surface of your pieces (Year: 2024).*
Translation of CN112936847 (Year: 2021).*
(Continued)

*Primary Examiner* — Farah Taufiq
(74) *Attorney, Agent, or Firm* — IPro, PLLC

(57) ABSTRACT

A printer control method, a printer, and a computer-readable storage medium are provided. The method includes: controlling a print head assembly of a printer to print a target outer wall set of a three-dimensional model; and controlling the print head assembly to print a target infill set corresponding to the target outer wall set, with the number of layers contained in the target infill set being less than that contained in the target outer wall set, thereby enhancing surface quality of the three-dimensional model while reducing printing time.

12 Claims, 7 Drawing Sheets

(56) References Cited

OTHER PUBLICATIONS

Dora Ding, Variable Layer Height, https://wiki.bambulab.com/en/
software/bambu-studio/adaptive-layer-height (Year: 2024).*
Monocure 3D Optimal Print Angle Calculator; https://monocure3d.
com.au/print-angle-calculator/ (Year: 2025).*
Moddb Triangle Mesh Voxelization https://www.moddb.com/games/
overgrowth/news/triangle-mesh-voxelization-aka-lego-rabbits (Year:
2009).*
3D Printing Settings Impacting Part Strength (Year: 2021).*
DE 202025103945.1, search report dated Feb. 25, 2026.
DE 202025103938.9, search report dated Feb. 26, 2026.

* cited by examiner

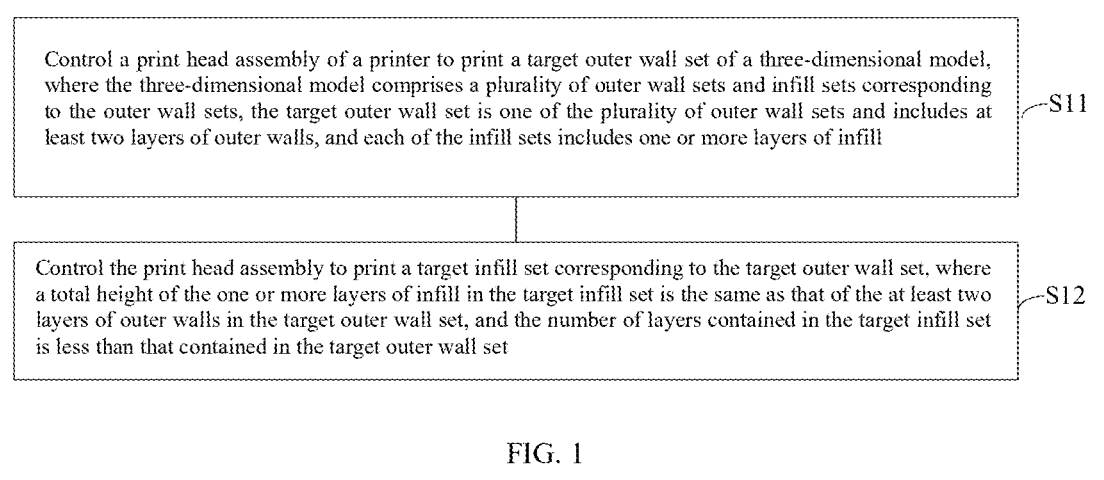

Control a print head assembly of a printer to print a target outer wall set of a three-dimensional model, where the three-dimensional model comprises a plurality of outer wall sets and infill sets corresponding to the outer wall sets, the target outer wall set is one of the plurality of outer wall sets and includes at least two layers of outer walls, and each of the infill sets includes one or more layers of infill $\sim$S11

Control the print head assembly to print a target infill set corresponding to the target outer wall set, where a total height of the one or more layers of infill in the target infill set is the same as that of the at least two layers of outer walls in the target outer wall set, and the number of layers contained in the target infill set is less than that contained in the target outer wall set $\sim$S12

FIG. 1

Control system 30

First controller 31

FIG. 3

Control a first acquisition device to acquire first detection information of a print head assembly of a printer ⌐S41

Perform at least one calibration on the print head assembly based on the first detection information ⌐S42

Control system 50

Second controller 51

FIG. 5

PRINTER CONTROL METHOD, PRINTER, AND COMPUTER-READABLE STORAGE MEDIUM

CROSS-REFERENCE TO RELATED APPLICATIONS

The present application claims priority to Chinese Patent Application No. 202510851927.4 filed with the China National Intellectual Property Administration on Jun. 20, 2025 and entitled "PRINTER CONTROL METHOD, PRINTER, AND COMPUTER-READABLE STORAGE MEDIUM", and Chinese Patent Application No. 202510284203.6 filed with the China National Intellectual Property Administration on Mar. 7, 2025 and entitled "PRINTER CONTROL METHOD, PRINTER, STORAGE MEDIUM, AND COMPUTER PROGRAM PRODUCT", both of which are incorporated herein by reference in their entireties.

TECHNICAL FIELD

The present application relates to, but is not limited to, the technical field of printers, and in particular, to a printer control method, a printer, and a computer-readable storage medium.

BACKGROUND

In the related art, Fused Deposition Modeling (FDM) is a method of heating and melting various hot-melt filamentary materials (e.g., ABS, nylon, PLA, etc.) into a shape, representing one type of three-dimensional (3D) printing technology, also referred to as Fused Filament Modeling (FFM) or Fused Filament Fabrication (FFF), where FDM 3D printers mainly have the following problems:

FDM 3D printers construct 3D models by layering melted filaments. Since each layer has a specific height, a larger layer height results in a less smooth model surface, thereby reducing the structural strength of the 3D models and increasing post-processing costs. Although reducing a layer height may improve the surface quality of the 3D models, it correspondingly increases the number of both layers of outer walls and layers of infill, significantly extending printing time.

SUMMARY

A printer control method, a printer, and a computer-readable storage medium are provided according to embodiments of the present application, aiming to solve the problems in the related art where FDM 3D printers cannot simultaneously achieve both surface accuracy of printed 3D models and reduced printing time. The technical solutions of the embodiments of the present application are implemented as follows.

A printer control method is provided according to an embodiment of the present application. The printer control method includes:

controlling a print head assembly of a printer to print a target outer wall set of a three-dimensional model, where the three-dimensional model includes a plurality of outer wall sets and infill sets corresponding to the plurality of outer wall sets, the target outer wall set is one of the plurality of outer wall sets and includes at least two layers of outer walls, and each of the infill sets includes one or more layers of infill; and controlling the print head assembly to print a target infill set corresponding to the target outer wall set, where a total height of the one or more layers of infill in the target infill set is the same as that of the at least two layers of outer walls in the target outer wall set, and the number of layers contained in the target infill set is less than that contained in the target outer wall set.

In the present embodiment of the present application, by first printing an outer wall set including at least two layers of outer walls and then printing an infill set including one or more layers of infill, on one hand, compared with conventional technologies in the related art where the outer walls and the infill have the same layer height, the present application employs a smaller layer height for the outer walls than for the infill, thereby improving the printing quality of the outer surface of the three-dimensional model, enhancing the structural strength of the three-dimensional model, and reducing post-processing costs; on the other hand, compared with conventional technologies in the related art where one layer of outer wall is printed followed by one layer of infill, the present application enables merged printing of a plurality of layers of infill by making the height of one layer of infill equal to that of at least two layers of outer walls, significantly reducing printing time.

In some embodiments, the print head assembly includes one nozzle; controlling the print head assembly of the printer to print the target outer wall set of the three-dimensional model includes: controlling the nozzle to print the target outer wall set; and controlling the print head assembly to print the target infill set corresponding to the target outer wall set includes: controlling the nozzle to print the target infill set corresponding to the target outer wall set.

In these embodiments of the present application, by employing one nozzle to print both the outer wall sets and the infill sets: firstly, maintaining consistent material extrusion parameters (e.g., temperature, flow rate, etc.) reduces interlayer bonding issues caused by parameter variations, thereby enhancing the integrity between internal and external structures; secondly, compared to multi-nozzle operations, the use of one nozzle eliminates the mechanical complexity of multi-nozzle systems (e.g., calibration, synchronous control, etc.), reduces hardware failure rates and maintenance difficulty, and since no nozzle switching process is required, minimizes printing interruptions or material residue issues caused by switching, thereby improving equipment reliability and shortening the overall printing cycle; finally, continuous extrusion through one nozzle decreases the movement frequency of the print head assembly, reduces vibration errors caused by frequent starts and stops, and improves dimensional accuracy, consequently enhancing printing quality.

In some embodiments, controlling the nozzle to print the target outer wall set includes: for each of the at least two layers of outer walls in the target outer wall set, adjusting a height of the nozzle to a height corresponding to the outer wall and controlling the nozzle to print the outer wall; and controlling the nozzle to print the target infill set corresponding to the target outer wall set includes: for each of the one or more layers of infill in the target infill set, adjusting the height of the nozzle to a height corresponding to the infill and controlling the nozzle to print the infill.

In an embodiment of the present application, by dynamically adjusting the nozzle height to respectively match the printing requirements for the layers of outer walls and infill, precise layer-by-layer construction of model structures is achieved: during outer wall printing, automatic alignment with corresponding layer heights ensures continuity of facade profiles and perpendicular accuracy; meanwhile, synchronously switching to appropriate heights of the layers of infill for internal structure printing not only guarantees the mechanical properties of the overall structure but also optimizes material distribution efficiency through layered control, ultimately realizing dual improvements in both structural integrity and model accuracy during architectural 3D printing processes.

In some embodiments, the print head assembly includes a first nozzle and a second nozzle; controlling the print head assembly of the printer to print the target outer wall set of the three-dimensional model includes: controlling a first target nozzle to print the target outer wall set, where the first target nozzle is selected from the first nozzle or the second nozzle; and controlling the print head assembly to print the target infill set corresponding to the target outer wall set includes: controlling a second target nozzle to print the target infill set corresponding to the target outer wall set, where the second target nozzle is selected from the first nozzle or the second nozzle.

In these embodiments of the present application, on one hand, when one nozzle is used to print both the outer wall sets and the infill sets, maintaining consistent material extrusion parameters reduces interlayer bonding issues caused by parameter variations, thereby enhancing the integrity between internal and external structures, and since no nozzle switching process is required, printing interruptions or material residue issues caused by switching are minimized, thereby improving equipment reliability and shortening the overall printing cycle; on the other hand, when two nozzles are used to separately print the outer wall sets and the infill sets, this configuration reduces the possibility of residual contamination during material switching in one nozzle, not only ensuring the purity of both outer walls and infill while reducing unnecessary material consumption, but also ensuring superior surface printing quality while reinforcing internal structural strength, thus optimizing printing quality and reducing costs; furthermore, by integrating two nozzles in the print head assembly, the dual-nozzle configuration can respectively handle model materials and soluble support materials (e.g., water-soluble or low-temperature hot-melt materials), enabling a smoother surface after support removal and reducing post-processing damage risks, while simultaneously supporting concurrent printing of two different materials (e.g., metal+ceramic or two polymers) to impart multi-zone functional characteristics to models (e.g., local conductivity, high-temperature resistance), thereby making it particularly suitable for applications requiring high complexity, functional diversity, or production efficiency.

In some embodiments, controlling the first target nozzle to print the target outer wall set includes: for each of the at least two layers of outer walls in the target outer wall set, adjusting a height of the first target nozzle to a height corresponding to the outer wall and controlling the first target nozzle to print the outer wall.

In these embodiments of the present application, on one hand, sequentially printing the layers of outer walls according to their order not only improves printing accuracy but also ensures printing quality while reducing printing time; on the other hand, an appropriate nozzle height enables molten materials to uniformly adhere to the printing platform, preventing first-layer warping or demolding, with particularly notable effectiveness for thermally sensitive materials such as PLA and ABS, while simultaneously addressing the issue that an excessively high nozzle position may prevent proper compaction of extruded filaments, creating gaps or interlayer separation, whereas an excessively low nozzle position may scratch already printed layers and damage surface texture, therefore the appropriate nozzle height can reduce such errors, optimize dimensional accuracy, and flexibly accommodate multi-material printing requirements.

In some embodiments, controlling the second target nozzle to print the target infill set corresponding to the target outer wall set includes: for each of the one or more layers of infill in the target infill set, adjusting a height of the second target nozzle to a height corresponding to the infill and controlling the second target nozzle to print the infill.

In these embodiments of the present application, on one hand, sequentially printing the layers of infill according to their order improves printing accuracy; on the other hand, an appropriate nozzle height enables molten materials to uniformly adhere to the printing platform, preventing first-layer warping or demolding, with particularly notable effectiveness for thermally sensitive materials such as PLA and ABS, while simultaneously addressing the issue that an excessively high nozzle position may prevent proper compaction of extruded filaments, creating gaps or interlayer separation, whereas an excessively low nozzle position may scratch already printed layers and damage surface texture, therefore the appropriate nozzle height can reduce such errors, optimize dimensional accuracy, and flexibly accommodate multi-material printing requirements.

In some embodiments, the control method further includes: determining the first target nozzle based on characteristics of the first nozzle, characteristics of the second nozzle, and heights of the at least two layers of outer walls in the target outer wall set; and determining the second target nozzle based on the characteristics of the first nozzle, the characteristics of the second nozzle, and heights of the one or more layers of infill in the target infill set, where the characteristics of the first nozzle include at least one of the following: a diameter of the first nozzle, a color of a filament in the first nozzle, or a type of the filament in the first nozzle; and the characteristics of the second nozzle include at least one of the following: a diameter of the second nozzle, a color of a filament in the second nozzle, or a type of the filament in the second nozzle.

In these embodiments of the present application, by intelligently matching nozzle characteristics with printing requirements, collaborative optimization of multi-material and multi-precision architectural 3D printing is achieved: based on structural characteristics of the layers of outer walls and infill (e.g., height, functional requirements, etc.) and combined with different nozzles' characteristics including diameters, filament types, and colors, dynamically allocating a first target nozzle (dedicated to outer walls) and a second target nozzle (dedicated to infill), thereby simultaneously realizing both high-precision aesthetic forming of outer walls and functional efficient construction of the layers of infill in a single printing process, which not only satisfies mechanical properties of materials and decorative requirements but also improves material utilization and overall printing efficiency through differentiated configuration.

In some embodiments, the control method further includes: for each of the at least two layers of outer walls in the target outer wall set, determining a first control parameter corresponding to a height of the outer wall, and controlling the first target nozzle to extrude a filament according to the first control parameter to print the outer wall; and for each of the one or more layers of infill in the target infill set, determining a second control parameter corresponding to a height of the infill, and controlling the second target nozzle to extrude the filament according to the second control parameter to print the infill.

In some embodiments, the first control parameter includes at least one of a first temperature or a first flow rate; and the second control parameter includes at least one of a second temperature or a second flow rate.

In these embodiments of the present application, by dynamically optimizing nozzle control parameters, refined layered control for architectural 3D printing is achieved: for the layers of outer walls, first temperature/flow rate parameters are matched according to height to ensure high-precision forming of facade structures and surface quality; while second temperature/flow rate parameters are adapted for the layers of infill to ensure both the strength of internal structures and printing efficiency. Through differentiated parameter regulation of dual nozzles, the aesthetic and durability requirements for outer walls are simultaneously met with the functional requirements for the layers of infill in a single printing process, not only enhancing the overall model precision but also reducing material waste and shortening printing time through parameter self-adaptation mechanisms.

In some embodiments, the three-dimensional model includes at least one section, and for each of the plurality of outer wall sets, heights of the at least two layers of outer walls in the outer wall set are determined based on a section of the at least one section corresponding to the outer wall set.

In these embodiments, the heights of the at least two layers of outer walls in the outer wall set are dynamically determined according to the section of the at least one section corresponding to the outer wall set, which, compared with a uniform height of the layers of outer walls, not only improves the accuracy, flexibility and specificity of the heights of the layers of outer walls, but also enhances the conformity between printed models and the three-dimensional model, thereby further improving surface smoothness and detail reproduction accuracy.

In some embodiments, the heights of the at least two layers of outer walls in the outer wall set are the same.

In these embodiments of the present application, by setting the same layer height for all outer walls in the outer wall sets, printing efficiency is optimized while ensuring printing quality, where the fixed outer wall height enables a standardized printing process that significantly improves construction efficiency and consistency: since all outer walls share the same height, the first target nozzle can maintain a constant first control parameter (temperature/flow rate), avoiding precision fluctuations caused by frequent adjustments and ensuring uniform flatness of architectural facades; meanwhile, by complementing dynamic parameters of the layers of infill, it maintains structural integrity while reducing system complexity through modular printing of the layers of outer walls, ensuring both printing speed and architectural appearance quality, thereby making it particularly suitable for rapid forming of standardized architectural components.

In some embodiments, the section corresponding to the outer wall set include a plurality of triangles, and the heights of the at least two layers of outer walls in the outer wall set are determined based on a target angle between a normal vector of a target triangle in the section corresponding to the outer wall set and a target direction, with the target direction being perpendicular to the section corresponding to the outer wall set.

In these embodiments of the present application, by dynamically determining the heights of the at least two layers of outer walls based on the target angle between the normal vector of the target triangle in the section and the direction perpendicular to the section, precision requirements for different printing areas are more accurately identified: for triangular surfaces with larger slopes, smaller layer heights are employed to reduce errors, while for triangular surfaces with smaller slopes, larger layer heights are used to improve printing efficiency, ensuring that the printing results meet the precision requirements while optimizing printing efficiency, thereby achieving an optimal balance between quality and speed.

In some embodiments, the heights of the at least two layers of outer walls in the outer wall set are determined based on the target angle and a maximum surface deviation, where the maximum surface deviation is determined based on printing parameters of the printer, and the printing parameters include a layer height and a target ratio between a printing detail and a printing speed; or the maximum surface deviation is dynamically determined by a target interpolation function, where a parameter in the target interpolation function is determined based on a layer height and a target ratio between a printing detail and a printing speed.

In these embodiments of the present application, the heights of the at least two layers of outer walls are dynamically adjusted based on the target angle corresponding to the section and the maximum surface deviation, where the adjustment of the heights of the at least two layers is constrained by the maximum surface deviation to select higher layer heights for reducing printing time while avoiding resource waste caused by excessively pursuing low layer heights, achieving an optimal balance between quality and efficiency, thereby making it particularly suitable for manufacturing complex models requiring simultaneous consideration of cost, speed, and precision.

In these embodiments of the present application, the maximum surface deviation is dynamically determined based on printing parameters including a layer height and a target ratio, which, compared to a fixed maximum surface deviation, improves the accuracy, flexibility, and specificity of the maximum surface deviation, further enhancing the accuracy of layer height determination based on the maximum surface deviation, and ensuring printing precision while optimizing printing efficiency, thereby making it particularly suitable for processing models with complex geometric features (e.g., inclined surfaces, curved surfaces, etc.).

In these embodiments of the present application, the maximum surface deviation is determined according to a target interpolation function, which not only improves the accuracy of the maximum surface deviation but also ensures that the maximum surface deviation is always maintained within an allowable range, avoiding local overload or under-compensation, thereby making it particularly suitable for 3D printing applications requiring simultaneous consideration of precision, efficiency, and complex surface treatment.

In some embodiments, the heights of the at least two layers of outer walls in the outer wall set are directly proportional to the target angle.

In these embodiments of the present application, by establishing a direct proportional relationship between the layer heights and the target angles, precision requirements for different printing areas are more accurately identified: for areas with smaller angles, smaller layer heights are employed to reduce errors, while for areas with larger angles, larger layer heights are used to improve printing efficiency, ensuring that the printing results meet the precision requirements while optimizing printing efficiency, thereby achieving an optimal balance between quality and speed.

In some embodiments, for each of the plurality of outer wall sets, the number of layers contained in the outer wall set is determined based on a diameter of the print head assembly and heights of the at least two layers of outer walls in the outer wall set; and for each of the infill sets, the number of layers contained in the infill set and heights of the one or more layers of infill in the infill set are determined based on an outer wall set of the plurality of outer wall sets corresponding to the infill set.

In these embodiments of the present application, the number of layers of outer walls is dynamically determined according to the diameter of the print head assembly and the heights of layers of outer walls, achieving constraint of the number of layers of outer walls through the diameter of the print head assembly and the heights of layers of outer walls, which improves the accuracy and reasonableness of the number of layers and achieves an optimal balance between quality and efficiency.

In these embodiments of the present application, the corresponding number and heights of layers of infill are dynamically determined according to the number and heights of layers of outer walls, and by matching the infill height with the outer wall height: on one hand, the mechanical properties of internal support structures can be optimized to enable the three-dimensional model to achieve uniform compressive and tensile strength in both the XY plane and the Z-axis direction, thereby avoiding deformation, collapse, or local weakness of outer walls caused by stress concentration or directional differences; on the other hand, the load requirements for the model can be precisely matched to reduce material waste, while simultaneously realizing flexible configuration of both the number of layers of infill and the infill heights, ultimately achieving an optimal balance among strength, efficiency, cost, and environmental sustainability for printed models.

In some embodiments, the control method further includes: controlling the print head assembly of the printer to print a target inner wall set of the three-dimensional model, where the three-dimensional model further includes one or more layers of inner walls, each of the layers of inner walls corresponding to at least two inner wall sets, the at least two inner wall sets are located between the outer wall sets and the infill sets and configured to support the outer wall sets and connect the infill sets; and controlling the print head assembly to print the target outer wall set corresponding to the target inner wall set.

In these embodiments of the present application, by introducing the inner wall sets as a structural transition layer, multi-level collaborative optimization for architectural 3D printing is achieved: the inner wall sets form a mechanical buffer zone between the outer wall sets and the infill sets, which not only ensures facade stability by supporting the outer wall sets but also enhances overall structural rigidity by connecting to the infill sets; through synchronous control of the print head assembly to print both the inner wall sets and corresponding outer wall sets, seamless connection between load-bearing systems and infill structures is realized while maintaining architectural functional zoning, achieving a balance among printing efficiency, structural strength, and space utilization, thereby making it particularly suitable for integrated forming of complex architectural structures.

In some embodiments, before controlling the print head assembly of the printer to print the target outer wall set of the three-dimensional model, the control method further includes: controlling a first acquisition device to acquire first detection information of the print head assembly of the printer, where the print head assembly includes a first nozzle and a second nozzle, and the first detection information is used to determine a position of the first nozzle and a position of the second nozzle; performing at least one calibration on the print head assembly based on the first detection information, where the calibration includes: adjusting a coordinate reference of the print head assembly and/or adjusting a position of the print head assembly based on a deviation of the print head assembly in a case that the deviation exceeds a preset deviation range, where the deviation of the print head assembly is determined based on the position of the first nozzle and the position of the second nozzle; controlling the first acquisition device to acquire second detection information of the print head assembly after the calibration; and switching the printer to a ready state or resuming a printing task in a case that the second detection information indicates that the deviation of the print head assembly falls within the preset deviation range.

In this embodiment of the present application, through automatic detection and calibration of the print head assembly: firstly, automated calibration is achieved, which not only reduces manual calibration while improving production efficiency, but also decreases the likelihood of offset accumulation caused by mechanical installation errors, thermal expansion/contraction, and long-term use, thereby reducing the possibility of printing layer misalignment-induced defects such as seams, overlaps, and gaps, consequently enhancing printing accuracy and printer stability; secondly, real-time compensation of nozzle position errors during the calibration process ensures consistent layer precision during multi-material and multi-color printing, significantly improving print quality while guaranteeing that printing results meet high-precision requirements; finally, the first acquisition device can be integrated into existing FDM printers, demonstrating good compatibility and upgradability.

A printer is provided according to an embodiment of the present application. The printer includes: a print head assembly; a processor; and a memory storing thereon a computer program executable on the processor, where the processor, when executing the computer program, implements the method described in any one of the foregoing embodiments.

In some embodiment, the print head assembly includes a first nozzle and a second nozzle; one of the first nozzle and the second nozzle is fixed while the other nozzle is movable relative to the nozzle which is fixed in a direction perpendicular to a horizontal plane; and one of the first nozzle and the second nozzle is configured to print a material of the three-dimensional model while the other nozzle is configured to print a support material of the three-dimensional model.

A computer-readable storage medium is provided according to an embodiment of the present application. The computer-readable storage medium has a computer program stored thereon, where the computer program, when executed by a processor, implements the method described in any one of the foregoing embodiments.

It should be understood that the above general description and the following detailed description are only exemplary and explanatory, and cannot limit the present application.

BRIEF DESCRIPTION OF THE DRAWINGS

The accompanying drawings herein are incorporated in the specification as a part thereof, showing embodiments that are implemented in accordance with the present application and used together with the specification to explain the technical solutions of the present application.

FIG. 1 is a schematic diagram of an implementation process of a printer control method provided in an embodiment of the present application;

FIG. 3 is a schematic diagram of a structure of a printer control system provided in an embodiment of the present application;

FIG. 5 is a schematic diagram of a structure of another printer control system provided in an embodiment of the present application;

DETAILED DESCRIPTION

Figure 2:
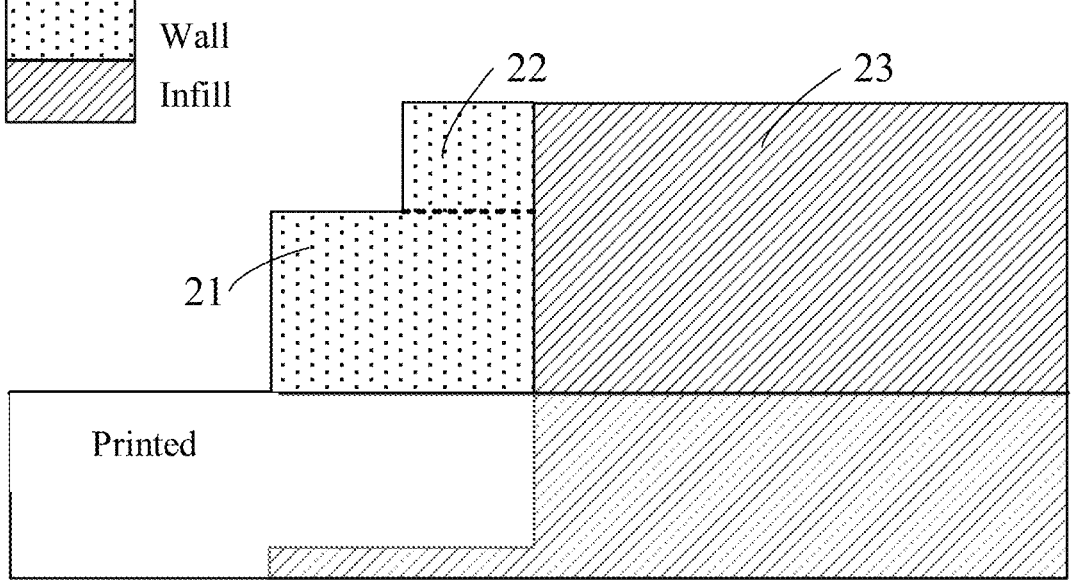
FIG. 2 is a schematic diagram of a print head assembly printing outer walls and infill provided in an embodiment of the present application.

To make the objectives, technical solutions, and advantages of the present application clearer, the following further describes the present application in detail with reference to the accompanying drawings. The described embodiments should not be considered as limiting the present application, and all other embodiments obtained by those of ordinary skill in the art without making creative efforts shall fall within the protection scope of the present application.

In the following description, reference is made to "some embodiments", which describe a subset of all possible embodiments; however, it will be understood that "some embodiments" may be the same subset or different subsets of all possible embodiments and may be combined with each other without conflict.

In the following description, the terms "first\second\third" involved are merely used to distinguish similar objects and do not represent a specific ordering of the objects. It can be understood that "first\second\third" can be interchanged with a specific order or sequence where permitted, so that the embodiments of the present application described herein can be implemented in an order other than that illustrated or described herein.

Unless otherwise defined, all technical and scientific terms used herein have the same meaning as those commonly understood by those skilled in the art of the present application. The terms used herein are only for the purpose of describing the embodiments of the present application and are not intended to limit the present application.

The method provided in the embodiments of the present application may be executed by electronic devices, which may include various types of terminals such as laptops, tablets, desktop computers, set-top boxes, mobile devices (e.g., mobile phones, portable music players, personal digital assistants, dedicated messaging devices, portable gaming devices, etc.), and printers, and may also be implemented as a server. The server may be an independent physical server, a server cluster or distributed system composed of a plurality of physical servers, or a cloud server providing fundamental cloud computing services including cloud services, cloud databases, cloud computing, cloud functions, cloud storage, network services, cloud communications, middleware services, domain name services, security services, content delivery networks (CDNs), as well as big data and artificial intelligence platforms.

The technical solutions in the embodiments of the present application will be clearly and completely described below with reference to the accompanying drawings in the embodiments of the present application.

FIG. 1 is a schematic diagram of an implementation process of a printer control method provided in an embodiment of the present application. As shown in FIG. 1, the control method includes the following steps S11 and S12.

In S11, a print head assembly of a printer is controlled to print a target outer wall set of a three-dimensional model, where the three-dimensional model includes a plurality of outer wall sets and infill sets corresponding to the outer wall sets, the target outer wall set is one of the plurality of outer wall sets and includes at least two layers of outer walls, and each of the infill sets includes one or more layers of infill.

In S12, the print head assembly is controlled to print a target infill set corresponding to the target outer wall set, where a total height of the one or more layers of infill in the target infill set is the same as that of the at least two layers of outer walls in the target outer wall set, and the number of layers contained in the target infill set is less than that contained in the target outer wall set.

Herein, the printer at least includes the print head assembly, a driving device, and a working platform.

The print head assembly is connected to the driving device and is configured to generate a relative displacement with respect to the working platform under the drive of the driving device, so as to perform operations such as 3D printing, engraving, and cutting on the working platform. The print head assembly may be any suitable assembly capable of performing printing functions. The print head assembly includes at least one nozzle. For example, the print head assembly may include one nozzle. As another example, the print head assembly may include two nozzles. In some embodiments, the print head assembly may further include a heating assembly configured to heat a printing material to a molten state, where the nozzle is configured to extrude the molten material to perform model printing on the printing platform.

In some embodiments, the nozzle for printing the outer wall sets and the nozzle for printing the infill sets may be the same or different. For example, when the print head assembly includes one nozzle, both the outer wall sets and the infill sets may be printed through this nozzle. As another example, when the print head assembly includes a first nozzle and a second nozzle, the first nozzle may be configured to print the outer wall sets while the second nozzle may be configured to print the infill sets, or alternatively, both the outer wall sets and the infill sets may be printed through at least one of the first nozzle or the second nozzle.

In some embodiments, the print head assembly includes one nozzle; the step S11 includes the following step S111; and the step S12 includes the following step S121.

In S111, the nozzle is controlled to print the target outer wall set.

In S121, the nozzle is controlled to print the target infill set corresponding to the target outer wall set.

Herein, the nozzle is controlled to first print the outer wall sets and then, after completion of printing the outer wall sets, print the infill sets corresponding to the outer wall sets.

In these embodiments of the present application, the nozzle is controlled to first print the target outer wall set, and then the target infill set corresponding to the target outer wall set. In this way, by employing one nozzle to print both the outer wall sets and the infill sets: firstly, maintaining consistent material extrusion parameters (e.g., temperature and flow rate, etc.) reduces interlayer bonding issues caused by parameter variations, thereby enhancing the integrity between internal and external structures; secondly, compared to multi-nozzle operations, the use of one nozzle eliminates the mechanical complexity of multi-nozzle systems (e.g., calibration, synchronous control, etc.), reduces hardware failure rates and maintenance difficulty, and since no nozzle switching process is required, minimizes printing interruptions or material residue issues caused by switching, thereby improving equipment reliability and shortening the overall printing cycle; finally, continuous extrusion through one nozzle decreases the movement frequency of the print head assembly, reduces vibration errors caused by frequent starts and stops, and improves dimensional accuracy, consequently enhancing printing quality.

In some embodiments, the print head assembly includes a first nozzle and a second nozzle; the step S11 includes the following step S112; and the step S12 includes the following step S122.

In S112, a first target nozzle is controlled to print the target outer wall set, where the first target nozzle is selected from the first nozzle or the second nozzle.

In S122, a second target nozzle is controlled to print the target infill set corresponding to the target outer wall set, where the second target nozzle is selected from the first nozzle or the second nozzle.

Herein, characteristics of the first nozzle and characteristics of the second nozzle may be the same or different. The characteristics may include, but are not limited to, diameter, filament color, filament type, etc. The filament color may include, but is not limited to, any suitable color such as red, blue, and black. The filament may include, but is not limited to, ABS, PLA, etc. For example, the diameter of the first nozzle among the two nozzles may be 0.2 mm, while the diameter of the second nozzle may be 0.4 mm. In some embodiments, one of the first nozzle and the second nozzle may be fixed, while the other nozzle may be movable relative to the nozzle which is fixed in a target direction, which may refer to a direction perpendicular to a horizontal plane (e.g., the Z-axis direction in a three-dimensional coordinate system). The displacement in the target direction must remain within a movement range, which may be any suitable small range, such as 0-10 mm and 0-8 mm. During implementation, this movement range may be comprehensively determined based on factors such as the size of the print head assembly, the diameter of the nozzle, and the movement precision. In some embodiments, both the first nozzle and the second nozzle may be movable in the target direction.

In some embodiments, the diameter of the first nozzle may be smaller than that of the second nozzle.

In some embodiments, since the outer walls serve as critical components of the three-dimensional model's appearance, smoother surfaces and finer details may be achieved through high-precision nozzles or appropriate printing speeds, while the infill may employ lower-precision nozzles or faster printing speeds to focus on strength of the internal structures. During implementation, the precision of the first nozzle may be greater than that of the second nozzle, and/or control parameters of the first nozzle may differ from those of the second nozzle. The control parameters may include, but are not limited to, temperature, flow rate, etc.

In some embodiments, the first nozzle is controlled to first print the outer wall sets and then, after completion of printing the outer wall sets, print the infill sets corresponding to the outer wall sets.

In some embodiments, the second nozzle is controlled to first print the outer wall sets and then, after completion of printing the outer wall sets, print the infill sets corresponding to the outer wall sets.

In some embodiments, the first nozzle is controlled to first print the outer wall sets and then, after completion of printing the outer wall sets, the second nozzle is controlled to print the infill sets corresponding to the outer wall sets.

In some embodiments, the second nozzle is controlled to first print the outer wall sets and then, after completion of printing the outer wall sets, the first nozzle is controlled to print the infill sets corresponding to the outer wall sets.

In some embodiments, for printing the target outer wall set, the layers of outer walls therein may be sequentially printed according to their order; and for printing the target infill set, the layers of infill therein may be sequentially printed according to their order.

In these embodiments of the present application, the first target nozzle is controlled to print the target outer wall set, where the first target nozzle is selected from the first nozzle or the second nozzle; and the second target nozzle is controlled to print the target infill set corresponding to the target outer wall set, where the second target nozzle is selected from the first nozzle or the second nozzle. In this way, on one hand, when one nozzle is used to print both the outer wall sets and the infill sets, maintaining consistent material extrusion parameters reduces interlayer bonding issues caused by parameter variations, thereby enhancing the integrity between internal and external structures, and since no nozzle switching process is required, printing interruptions or material residue issues caused by switching are minimized, thereby improving equipment reliability and shortening the overall printing cycle; on the other hand, when two nozzles are used to separately print the outer wall sets and the infill sets, this configuration reduces the possibility of residual contamination during material switching in one nozzle, not only ensuring the purity of both outer walls and infill while reducing unnecessary material consumption, but also ensuring superior surface printing quality while reinforcing internal structural strength, thus optimizing printing quality and reducing costs; furthermore, by integrating two nozzles in the print head assembly, the dual-nozzle configuration can respectively handle model materials and soluble support materials (e.g., water-soluble or low-temperature hot-melt materials), enabling a smoother surface after support removal and reducing post-processing damage risks, while simultaneously supporting concurrent printing of two different materials (e.g., metal+ceramic or two polymers) to impart multi-zone functional characteristics to models (e.g., local conductivity, high-temperature resistance), thereby making it particularly suitable for applications requiring high complexity, functional diversity, or production efficiency.

In some embodiments, the step S112 includes the step S1121.

In S1121, for each of the at least two layers of outer walls in the target outer wall set, a height of the first target nozzle is adjusted to a height corresponding to the outer wall and controlling the first target nozzle to print the outer wall.

Herein, the height of the nozzle needs to be adjusted before printing to facilitate the printing operation. During implementation, if the first target nozzle is the first nozzle, the height of the first nozzle may be lowered and/or the height of the second nozzle may be raised to reduce interference from the second nozzle with the outer wall printed by the first nozzle, thereby improving the printing quality of the outer wall; if the first target nozzle is the second nozzle, the height of the second nozzle may be lowered and/or the height of the first nozzle may be raised to reduce interference from the first nozzle with the outer wall printed by the second nozzle, thereby improving the printing quality of the outer wall.

The height corresponding to the outer wall may include, but is not limited to, the height of the outer wall, a height greater than that of the outer wall, or a height less than that of the outer wall. In some embodiments, during printing of the outer wall, the height of the first target nozzle may be adjusted in real-time, in which case the height corresponding to the outer wall may be less than that of the outer wall. In some embodiments, the height of the first target nozzle may be adjusted to be greater than that of the outer wall, thereby not only reducing the number of height adjustments required for the first target nozzle but also decreasing the likelihood of contact between the first target nozzle and previously printed portions of the outer wall.

In these embodiments of the present application, on one hand, sequentially printing the layers of outer walls according to their order not only improves printing accuracy but also ensures printing quality while reducing printing time; on the other hand, an appropriate nozzle height enables molten materials to uniformly adhere to the printing platform, preventing first-layer warping or demolding, with particularly notable effectiveness for thermally sensitive materials such as PLA and ABS, while simultaneously addressing the issue that an excessively high nozzle position may prevent proper compaction of extruded filaments, creating gaps or interlayer separation, whereas an excessively low nozzle position may scratch already printed layers and damage surface texture, therefore the appropriate nozzle height can reduce such errors, optimize dimensional accuracy, and flexibly accommodate multi-material printing requirements.

In some embodiments, the step S122 includes the following step S1221.

In S1221, for each of the one or more layers of infill in the target infill set, a height of the second target nozzle is adjusted to a height corresponding to the infill and controlling the second target nozzle to print the infill.

Herein, the height of the nozzle needs to be adjusted before printing to facilitate the printing operation. During implementation, if the second target nozzle is the first nozzle, the height of the first nozzle may be lowered and/or the height of the second nozzle may be raised to reduce interference from the second nozzle with the infill printed by the first nozzle, thereby improving the printing quality of the infill; if the second target nozzle is the second nozzle, the height of the second nozzle may be lowered and/or the height of the first nozzle may be raised to reduce interference from the first nozzle with the infill printed by the second nozzle, thereby improving the printing quality of the infill.

The height corresponding to the infill may include, but is not limited to, the height of the infill, a height greater than that of the infill, or a height less than that of the infill. In some embodiments, during printing of the infill, the height of the second target nozzle may be adjusted in real-time, in which case the height corresponding to the infill may be less than that of the infill. In some embodiments, the height of the second target nozzle may be adjusted to be greater than that of the infill, thereby not only reducing the number of height adjustments required for the second target nozzle but also decreasing the likelihood of contact between the second target nozzle and previously printed portions of the infill.

In these embodiments of the present application, on one hand, sequentially printing the layers of infill according to their order improves printing accuracy; on the other hand, an appropriate nozzle height enables molten materials to uniformly adhere to the printing platform, preventing first-layer warping or demolding, with particularly notable effectiveness for thermally sensitive materials such as PLA and ABS, while simultaneously addressing the issue that an excessively high nozzle position may prevent proper compaction of extruded filaments, creating gaps or interlayer separation, whereas an excessively low nozzle position may scratch already printed layers and damage surface texture, therefore the appropriate nozzle height can reduce such errors, optimize dimensional accuracy, and flexibly accommodate multi-material printing requirements.

FIG. 2 is a schematic diagram of a print head assembly printing outer walls and infill provided in an embodiment of the present application. As shown in FIG. 2, the print head assembly includes a first nozzle and a second nozzle, where the outer wall set includes a first outer wall 21 and a second outer wall 22, and the infill set includes a first infill 23. With the first outer wall 21 having a height of 0.18 mm, the second outer wall 22 having a height of 0.12 mm, and the first infill 23 having a height of 0.3 mm, the printing process of the print head assembly proceeds as follows.

First, the outer wall set is printed. The height of the first nozzle is lowered to print the first outer wall 21, and after completion of printing the first outer wall 21, the height of the first nozzle is raised to print the second outer wall 22.

After completion of printing the second outer wall 22, it is switched to the second nozzle.

Then the infill set is printed. The height of the second nozzle is lowered to print the first infill 23.

In this embodiment of the present application, sequentially printing the layers of outer walls according to their order followed by sequentially printing the layers of infill according to their order improves printing accuracy while ensuring printing quality and reducing printing time.

The three-dimensional model may be any suitable solid structure, for example, a sphere, a cube, etc. In some embodiments, prior to printing the three-dimensional model, printing data corresponding to the three-dimensional model may first be acquired, followed by sequential operations according to the printing data. The printing data may include, but is not limited to, a plurality of outer wall sets, infill sets corresponding to the outer wall sets, a printing sequence for the outer wall sets, and a printing sequence for the infill sets. In some embodiments, the print head assembly may be controlled to first print the outer wall sets and then print the corresponding infill sets.

In some embodiments, the three-dimensional model includes at least one section, and each of the at least one section is composed of a plurality of geometric shapes that may include, but are not limited to, triangles, rectangles, etc., where different sections may have the same or different dimensions. In some embodiments, each of the at least one section may correspond to a plurality of outer wall sets, where for the plurality of outer wall sets corresponding to the same section, two outer wall sets may contain the same number of layers, and heights of the layers of outer walls in the two outer wall sets may also be the same; while for the plurality of outer wall sets corresponding to two different sections, the number of layers contained in two outer wall sets, i.e., one outer wall set corresponding to one section and the other outer wall set corresponding to the other section, may be the same or different, and heights of the layers of outer walls in the two outer wall sets may be the same or different.

The outer wall set including the target outer wall set and other outer wall sets mentioned herein includes at least two layers of outer walls, where the heights of the at least two layers of outer walls may be the same or different. The outer surface (exterior wall) forms the outermost layer of the model, directly affecting both aesthetic quality and mechanical strength, and by printing a plurality of outer wall sets, the printing of the model's outer surface can be achieved.

The height of the outer wall or layer height may be any suitable height, for example, 0.06 mm, 0.1 mm, etc.

In some embodiments, the height of the outer wall may be determined based on at least one of the following: a diameter of the first nozzle, a section corresponding to the outer wall set, or a filament of the first nozzle, where the first nozzle is the nozzle for printing the outer wall.

In some embodiments, different filaments may correspond to the same or different layer heights of outer walls. During implementation, a correspondence relationship between each filament and a layer height of each outer wall may be pre-established, and according to the correspondence relationship, the layer height of the outer wall corresponding to the filament may be determined.

In some embodiments, the diameter of each nozzle corresponds to an appropriate printable layer height range. The fundamental principle of 3D printing involves melting and depositing a filament onto a plane through an extruder and heated nozzle, then stacking subsequent layers upon completion of the printing on a current plane. The vertical distance between the deposited filament and the plane constitutes the layer height. When the filament is melted and directly deposited on the plane, since the nozzle is typically circular, its cross-section is circular or approximately cylindrical. To ensure good interlayer bonding, the contact area between adjacent layers should be maximized, thus necessitating a restrained layer height. To increase the contact area between adjacent layers, the nozzle should be lowered in height, causing the extruded filament to deform under pressure into a quasi-rectangular shape with arc-shaped lateral edges. As the filament undergoes deformation, the extruder experiences corresponding reactive forces. That is to say, the extruder must apply pressure to the filament to enable proper deformation of the ultimately extruded filament between the nozzle and the printed layer. The pressure applied at the base is constrained by factors such as extruder capability and filament characteristics, having an upper limit of extrusion pressure. When the nozzle is positioned too low, insufficient pressure results in discontinuous extrusion, leading to poor model surface quality; meanwhile, the excessively low flow rate of the filament within the nozzle may cause additional issues. In such cases, a nozzle with a smaller diameter should be employed to facilitate easier extrusion of the base filament. Therefore, to ensure superior printing quality, a smaller diameter of the nozzle generally corresponds to a lower permissible layer height. Consequently, when ensuring both superior surface quality and structural strength of the model, a larger diameter of the nozzle generally accommodates a greater layer height, while conversely, a smaller diameter of the nozzle typically accommodates a reduced layer height. Excessively small or large layer heights compromise material flow characteristics and interlayer bonding strength, resulting in printing failures, diminished surface quality, reduced structural strength, etc. On that account, the diameter of each nozzle corresponds to an appropriate printable layer height range.

In some embodiments, different diameters of the nozzle correspond to different layer height ranges, from which the height of the outer wall may be determined. For example, when the diameter of the nozzle is 0.8 mm, the layer height range may be 0.24-0.56 mm; when the diameter of the nozzle is 0.4 mm, the layer height range may be 0.08-0.28 mm; and when the diameter of the nozzle is 0.2 mm, the layer height range may be 0.06-0.14 mm. The height of the outer wall may be determined from the layer height range through any suitable method. For example, the height of the outer wall may be determined from the layer height range according to user settings or default values. As another example, the value such as the mean, median, maximum, or minimum of the layer height range may be adopted as the layer height of the outer wall by default. Also for example, the height of the outer wall may be further determined from the layer height range according to factors such as the section corresponding to the outer wall set and the filament of the nozzle.

In some embodiments, the three-dimensional model includes at least one section, and for each of the plurality of outer wall sets, heights of the at least two layers of outer walls in the outer wall set are determined based on a section of the at least one section corresponding to the outer wall set.

Herein, the three-dimensional model includes a plurality of sections, each of which corresponds to a plurality of outer wall sets, and the printing of the section is completed by printing the plurality of outer wall sets.

The layer height of the outer wall may be determined through any suitable method.

For example, the layer height of the outer wall may be determined according to the area of the section, where different areas may correspond to different layer heights. In some embodiments, a correspondence relationship between each area and each layer height may be pre-established, and according to the correspondence relationship, the layer height adapted to the area may be obtained. In some embodiments, the layer height of the outer wall may be determined according to the area of the section through any suitable area-error-based adaptive slicing algorithm. In some embodiments, the layer height adapted to the area of the slice may be determined through any suitable neural network model capable of implementing the function of determining a layer height according to an area.

As another example, the layer height of the outer wall may be determined according to the slope of the section, where a steeper slope corresponds to a smaller layer height of the outer wall, while a gentler slope corresponds to a greater layer height of the outer wall. The slope of the section may be determined through any suitable method. In some embodiments, a correspondence relationship between each slope and each layer height may be pre-established, and according to the correspondence relationship, the layer height adapted to the slope may be obtained. In some embodiments, the layer height of the outer wall may be determined according to the slope of the section through any suitable slope-error-based adaptive slicing algorithm. In some embodiments, the layer height adapted to the slope of the slice may be determined through any suitable neural network model capable of implementing the function of determining a layer height according to a slope.

In some embodiments, the layer heights of respective outer walls within the outer wall set may be the same or different. Different outer wall sets corresponding to different sections may have varying layer heights of outer walls to achieve variable-diameter printing.

In these embodiments, the heights of layers of outer walls in the outer wall sets are dynamically determined according to the sections corresponding to the outer wall sets, which, compared with a uniform height of the layers of outer walls, not only improves the accuracy, flexibility and specificity of the heights of layers of outer walls, but also enhances the conformity between printed models and the three-dimensional model, thereby further improving surface smoothness and detail reproduction accuracy.

In some embodiments, the heights of the at least two layers of outer walls in the outer wall set are the same. By setting the same layer height for all outer walls in the outer wall set, it ensures printing quality while improving printing efficiency.

In some embodiments, the section corresponding to the outer wall set includes a plurality of triangles, and the heights of the at least two layers of outer walls in the outer wall set are determined based on a target angle between a normal vector of the target triangle in the section corresponding to the outer wall set and a target direction. Herein, the target direction is perpendicular to the section corresponding to the outer wall set, e.g., the Z-axis direction in a three-dimensional coordinate system. The target triangle or triangular face refers to a triangle within the section. During implementation, the angle between the normal vector of the triangle and the target direction may first be determined, followed by comparing these angles to select a certain angle's corresponding triangle as the target triangle, with the angle serving as the target angle. This target angle may be the smallest or largest angle among all angles, or the angle closest to a preset angle. For example, the smallest angle may be selected as the target angle.

The layer height of the outer wall may be determined through any suitable method. In some embodiments, a correspondence relationship between each angle and each layer height may be pre-established, and according to the correspondence relationship, the layer height adapted to the target angle may be obtained. In some embodiments, the layer height of the outer wall may be determined according to the target angle through any suitable angle-error-based adaptive slicing algorithm. In some embodiments, the layer height adapted to the target angle may be determined through any suitable neural network model capable of implementing the function of determining a layer height according to an angle.

In these embodiments of the present application, by dynamically determining the heights of the at least two layers of outer walls based on the target angle between the normal vector of the target triangle in the section and the direction perpendicular to the section, precision requirements for different printing areas are more accurately identified: for triangular surfaces with larger slopes, smaller layer heights are employed to reduce errors, while for triangular surfaces with smaller slopes, larger layer heights are used to improve printing efficiency, ensuring that the printing results meet the precision requirements while optimizing printing efficiency, thereby achieving an optimal balance between quality and speed.

In some embodiments, the heights of the at least two layers of outer walls in the outer wall set are directly proportional to the target angle. That is to say, a larger target angle may correspond to a greater outer wall height, while a smaller target angle may correspond to a smaller outer wall height. In this way, by establishing a direct proportional relationship between the layer heights and the target angles, precision requirements for different printing areas are more accurately identified: for areas with smaller angles (i.e., steeper triangular face slopes), smaller layer heights are employed to reduce errors, while for areas with larger angles (i.e., gentler triangular face slopes), larger layer heights are used to improve printing efficiency, ensuring that the printing results meet the precision requirements while optimizing printing efficiency, thereby achieving an optimal balance between quality and speed.

In some embodiments, the heights of the at least two layers of outer walls in the outer wall set are determined based on the target angle and a maximum surface deviation.

Herein, the maximum surface deviation represents the maximum value of the surface deviation. The maximum surface deviation may be preset by slicing software or determined in real-time based on printing parameters. The printing parameters may include, but are not limited to, a layer height and a target ratio between a printing detail and a printing speed.

The layer height of the outer wall may be determined through any suitable method. In some embodiments, a correspondence relationship between each angle, the maximum surface deviation, and each layer height may be pre-established, and according to the correspondence relationship, the layer height adapted to the target angle and the maximum surface deviation may be obtained. In some embodiments, the layer height of the outer wall may be determined according to the target angle and the maximum surface deviation through any suitable area-error-based adaptive slicing algorithm. In some embodiments, the layer height adapted to the target angle and the maximum surface deviation may be determined through any suitable neural network model capable of implementing the function of determining a layer height according to an angle and a maximum surface deviation.

In these embodiments of the present application, the heights of the at least two layers of outer walls are dynamically adjusted based on the target angle corresponding to the section and the maximum surface deviation, where the adjustment of the heights of the at least two layers is constrained by the maximum surface deviation to select higher layer heights for reducing printing time while avoiding resource waste caused by excessively pursuing low layer heights, achieving an optimal balance between quality and efficiency, thereby making it particularly suitable for manufacturing complex models requiring simultaneous consideration of cost, speed, and precision.

In some embodiments, the maximum surface deviation is determined based on printing parameters of the printer, and the printing parameters include a layer height and a target ratio between a printing detail and a printing speed.

Herein, the layer height may be any suitable layer height, such as 0.2 mm. The layer height may be customized by a user through slicing software or may be a default value.

The target ratio may be any suitable ratio, for example, 0.5, 0.52, etc. The target ratio may also be customized by a user through slicing software or may be a default value.

The maximum surface deviation may be determined through any suitable method. In some embodiments, a correspondence relationship between each layer height, each target ratio, and each maximum surface deviation may be pre-established, and according to the correspondence relationship, the maximum surface deviation adapted to the layer height and the target ratio may be obtained. In some embodiments, the maximum surface deviation adapted to the layer height and the target ratio may be determined through any suitable neural network model capable of implementing the function of determining a maximum surface deviation according to layer height and a target ratio.

In these embodiments of the present application, the maximum surface deviation is dynamically determined based on printing parameters including a layer height and a target ratio, which, compared to a fixed maximum surface deviation, improves the accuracy, flexibility, and specificity of the maximum surface deviation, further enhancing the accuracy of layer height determination based on the maximum surface deviation, and ensuring printing precision while optimizing printing efficiency, thereby making it particularly suitable for processing models with complex geometric features (e.g., inclined surfaces, curved surfaces, etc.).

In some embodiments, the maximum surface deviation is determined by a target interpolation function, where parameters in the target interpolation function are determined based on the layer height and the target ratio.

Herein, the target interpolation function may be any suitable interpolation function, for example, linear interpolation functions such as lerp(•), or second-order polynomial interpolation functions, or third-order spline interpolation functions, where the function lerp(a, b, t) may be expressed as: lerp(a, b, t)=a+(b−a)*t, when t=0, the result equals a; when t=1, the result equals b; and when t takes an intermediate value between (0,1), the result varies linearly between a and b.

The maximum surface deviation may be either a first value of the target interpolation function determined according to a first parameter, or a second value of the target interpolation function determined according to a second parameter. During implementation, if the target ratio is less than a preset value, the first value serves as the maximum surface deviation; if the target ratio is not less than the preset value, the second value serves as the maximum surface deviation. The preset value may be any suitable value such as 0.5 or 0.6.

For example, if the target interpolation function is lerp(•), both the first parameter and the second parameter include a, b, t. During implementation, a may be taken as the minimum layer height ε1, b as the target ratio, and t as the maximum layer height ε2.

The minimum layer height ε1 may be determined through any suitable method. In some embodiments, the minimum layer height ε1 may be customized by a user through slicing software or may be a default value. In some embodiments, the minimum layer height ε1 may be determined according to the diameter of the nozzle. Methods for determining the minimum layer height ε1 may include, but are not limited to: the product between the diameter of the nozzle and a first weighting coefficient, or a weighted value of the product. The first weighting coefficient may be any suitable value such as 0.2, 0.15, or 0.3.

The maximum layer height ε2 may be determined through any suitable method. In some embodiments, the maximum layer height ε2 may be customized by a user through slicing software or may be a default value. In some embodiments, the maximum layer height ε2 may be determined according to the diameter of the nozzle. Methods for determining the maximum layer height ε2 may include, but are not limited to: the product between the diameter of the nozzle and a second weighting coefficient, or a weighted value of the product. The second weighting coefficient may be any suitable value such as 0.7, 0.75, or 0.8. During implementation, the second weighting coefficient is greater than the first weighting coefficient, where both the first and second weighting coefficients may be independently configured according to actual requirements, which is not limited in this embodiment of the present application.

In these embodiments of the present application, the maximum surface deviation is determined according to a target interpolation function, which not only improves the accuracy of the maximum surface deviation but also ensures that the maximum surface deviation is always maintained within an allowable range, avoiding local overload or under-compensation, thereby making it particularly suitable for 3D printing applications requiring simultaneous consideration of precision, efficiency, and complex surface treatment.

In some embodiments, for 3D models with complex geometric features, an appropriate adaptive slicing algorithm may be employed to determine the layer height of the outer wall. For example, the adaptive slicing algorithm may be an area-error-based Vojtech algorithm, whose core concept involves dynamically adjusting the layer height according to the triangular face slope while controlling the area error through the maximum surface deviation: a steeper triangular slope utilizes a smaller layer height to reduce the error, while a gentler triangular slope employs a larger layer height to improve printing efficiency, thereby ensuring printed results meet precision requirements while simultaneously optimizing printing efficiency.

The first layer height l_h1 corresponding to the triangular face calculated by the Vojtech algorithm may be expressed by the following formula (1-1), namely:

$$\text{l\_h1} = \alpha \cdot \sqrt{\frac{\text{max\_s\_d} * \text{n\_sin}\theta}{\text{n\_cos}\theta}} ; \qquad (1\text{-}1)$$

where max_s_d represents the maximum surface deviation, which controls printing precision; n_sin $\theta$ represents a vertical component of a normal vector $\vec{n}$ in the Z-direction (i.e., the slope of the triangular face); n_cos $\theta$ represents a horizontal component of the normal vector $\vec{n}$ in the Z-direction (i.e., the flatness of the triangular face); and $\alpha$ represents a weighting coefficient, and a may be any suitable value such as 1.44.

In some embodiments, when the normal vector of the triangular face approaches vertical (n_cos $\theta$→0), the first layer height l_h1 in Formula (1-1) tends toward infinity, causing a failure in calculation of the first layer height corresponding to the triangular face. Therefore, constraints need to be added in practice. For example, setting a minimum threshold for n_cos $\theta$: when n_cos $\theta$ is less than the minimum threshold, the target layer height corresponding to the triangular face may be a maximum layer height FLT_MAX (indicating incalculable); when n_cos $\theta$ is not less than the minimum threshold, the target layer height corresponding to the triangular face may be l_h1 in Formula (1-1). Consequently, the target layer height face_l_h corresponding to the triangular face may be expressed by the following formula (1-2), namely:

$$\text{face\_l\_h} = \min\left(\frac{\text{max\_s\_d}}{\gamma 1}, ((\text{n\_cos}\theta > \gamma 2)?\text{l\_h1} : \text{FLT\_MAX})\right); \qquad (1\text{-}2)$$

where max_s_d represents the maximum surface deviation; $\gamma 1$ represents a deviation weighting coefficient, and $\gamma 1$ may be any suitable value such as 0.184 or 0.2; n_cos $\theta$ represents the horizontal component of the triangular face's normal vector $\vec{n}$ in the Z-direction; $\gamma 2$ represents the minimum threshold, and $\gamma 2$ may be any suitable value such as 1e-5; and FLT_MAX represents the maximum layer height.

In some embodiments, the maximum surface deviation max_s_d may be determined according to the following formula (1-3), namely:

$$\text{max\_s\_d} = (c < 0.5)?X1:X2; \tag{1-3}$$

where $X1=\text{lerp}(\varepsilon1,\text{delta\_mid},\mu*c)$; $X2=\text{lerp}(\varepsilon2, \text{delta\_mid},\mu*(1.0-c))$; c represents a target ratio between a printing detail and a printing speed; delta_mid represents a configured layer height; $\varepsilon1$ represents a minimum layer height; $\varepsilon2$ represents a maximum layer height; u represents a ratio weighting coefficient that may be any suitable value such as 2, 2.5, or 3; and the function lerp(•) is a linear interpolation function.

Thus, the height of the outer wall may be determined according to all target layer heights corresponding to the triangular faces in the section. For example, the minimum target layer height among all target layer heights corresponding to the triangular faces may be taken as the height of the outer wall. As another example, the mean of the target layer heights corresponding to all triangular faces may be taken as the height of the outer wall. Furthermore, the median of the target layer heights corresponding to all triangular faces may be taken as the height of the outer wall.

In some embodiments, the height height_t of the outer wall may be determined according to the following formula (1-4), namely:

$$\text{height\_t} = \min\left(\text{height}_c, \text{face\_}l_{h[i]}\right); \tag{1-4}$$

where face_l_h[i] represents a target layer height corresponding to an $i^{th}$ triangular face, which may be determined by the aforementioned formula (1-2); i does not exceed the total number of triangular faces in the section; height_c represents a current height of the outer wall. During implementation, the height height_t of the outer wall is determined through multiple iterations to take the minimum target layer height among all target layer heights corresponding to the triangular faces as the height of the outer wall.

In some embodiments, for each of the plurality of outer wall sets, the number of layers contained in the outer wall set is determined based on a diameter of the print head assembly and heights of the at least two layers of outer walls in the outer wall set. Herein, the diameter of the print head assembly refers to the diameter of the nozzle. During implementation, when the print head assembly includes a single nozzle, the diameter of the print head assembly equals the diameter of the single nozzle; when the print head assembly includes a plurality of nozzles, the diameter of the print head assembly corresponds to the diameter of the nozzle for printing the infill.

The number of layers contained in the outer wall set falls within a layer count range, where the minimum value of the layer count range is 2 and the maximum value is the floor value of $$\frac{d1}{\text{height\_t}},$$

with d1 being the diameter of the print head assembly and height_t being the height of the outer wall. In some embodiments, the number of layers contained in the outer wall set may be the floor value of $$\frac{d1}{\text{height\_t}}.$$

In some embodiments, the number of layers may be selected based on factors such as a printing precision and a printing speed. During implementation, the product of the number of layers contained in the outer wall set and the height of the outer wall shall not exceed the diameter of the nozzle for printing the infill.

In these embodiments of the present application, the number of layers of outer walls is dynamically determined according to the diameter of the print head assembly and the heights of layers of outer walls, achieving constraint of the number of layers of outer walls through the diameter of the print head assembly and the heights of layers of outer walls, which improves the accuracy and reasonableness of the number of layers and achieves an optimal balance between quality and efficiency.

The infill set including the target infill set and other infill sets mentioned herein includes one or more layers of infill, where the heights of the one or more layers of infill may be the same or different. The three-dimensional model includes infill, which determines the internal support structure and influences weight, material consumption, and mechanical properties. During the printing process, patterns such as grids/honeycombs or lines/crosses may be employed for infill. The grid/honeycomb pattern provides optimal strength at high densities and is suitable for load-bearing components. The line/cross pattern is applicable for conventional printing to balance efficiency and strength. Infill materials may include, but are not limited to, sound/heat insulation materials or grouting materials.

The height of the infill or layer height may be any suitable height, for example, 0.3 mm, 0.6 mm, etc.

In some embodiments, the height of the infill may be determined based on at least one of the following: a diameter of the second nozzle, a filament of the second nozzle, or an outer wall set corresponding to the infill set, where the second nozzle is the nozzle for printing the infill.

In some embodiments, different filaments may correspond to the same or different layer heights of infill. During implementation, a correspondence relationship between each filament and a layer height of each infill may be pre-established, and according to the correspondence relationship, the layer height of the infill corresponding to the filament may be determined.

In some embodiments, different diameters of the second nozzle may correspond to the same or different layer heights of infill. During implementation, a correspondence relationship between each diameter and a layer height of each infill may be pre-established, and according to the correspondence relationship, the layer height of the infill corresponding to the diameter of the second nozzle may be determined.

In some embodiments, for each of the infill sets, the number of layers contained in the infill set and heights of the one or more layers of infill in the infill set are determined based on an outer wall set of the plurality of outer wall sets corresponding to the infill set.

Herein, the number of layers contained in the infill set may be determined according to the height of each layer of infill in the infill set and the outer wall set corresponding to the infill set. For example, when the height of the infill is determined, the number of layers contained in the infill set is determined based on a ratio between the total height of the at least two layers of outer walls in the outer wall set and the height of the infill. For example, when the height of the infill is 0.3 mm, if the total height of the at least two layers of outer walls in the outer wall set is 0.3 mm, then the infill set contains 1 layer.

The height of each layer of infill contained in the infill set may be determined according to the number of layers contained in the infill set and the outer wall set corresponding to the infill set. For example, when the number of layers contained in the infill set is determined, the height of the infill is determined based on a ratio between the total height of the at least two layers of outer walls in the outer wall set and the number of layers contained in the infill set. For example, when the number of layers contained in the infill set is 2, if the total height of the at least two layers of outer walls in the outer wall set is 0.3 mm, then the height of the infill may be 0.15 mm.

In these embodiments of the present application, the number of layers contained in the infill set and heights of layers of infill in the infill set are determined based on the outer wall set corresponding to the infill set. In this way, the corresponding number and heights of layers of infill are dynamically determined according to the number and heights of layers of outer walls, and by matching the infill height with the outer wall height: on one hand, the mechanical properties of internal support structures can be optimized to enable the three-dimensional model to achieve uniform compressive and tensile strength in both the XY plane and the Z-axis direction, thereby avoiding deformation, collapse, or local weakness of outer walls caused by stress concentration or directional differences; on the other hand, the load requirements for the model can be precisely matched to reduce material waste, while simultaneously realizing flexible configuration of both the number of layers of infill and the infill heights, ultimately achieving an optimal balance among strength, efficiency, cost, and environmental sustainability for printed models.

In some embodiments, the three-dimensional model may further include one or more layers of inner walls located on an inner side of the outer surface for connecting infill structures and balancing internal support with external strength. Each inner wall may correspond to a plurality of inner wall sets, and by printing the plurality of inner wall sets, the printing of the at least one inner wall of the model is achieved. The printing of the inner wall may employ either variable-diameter or fixed-diameter printing. During implementation, if the variable-diameter printing is employed for the inner wall, the plurality of inner wall sets corresponding to the inner wall may be determined with reference to the aforementioned determination process for the outer wall sets.

In some embodiments, in a case that the three-dimensional model includes one or more layers of inner wall, the inner wall may be printed first, followed by the printing of the outer surface and the infill in sequence.

In this embodiment of the present application, a print head assembly of the printer is controlled to print a target outer wall set of a three-dimensional model, where the three-dimensional model includes a plurality of outer wall sets and infill sets corresponding to the outer wall sets, the target outer wall set is one of the plurality of outer wall sets and includes at least two layers of outer walls, and each of the infill sets includes one or more layers of infill; and the print head assembly is controlled to print a target infill set corresponding to the target outer wall set, where a total height of the one or more layers of infill in the target infill set is the same as that of the at least two layers of outer walls in the target outer wall set, and the number of layers contained in the target infill set is less than that contained in the target outer wall set. In this way, by first printing an outer wall set including at least two layers of outer walls and then printing an infill set including one or more layers of infill: on one hand, compared with conventional technologies in the related art where the layer height of outer walls is equal to that of infill, the present application employs a smaller layer height for the outer walls than for the infill, thereby improving the printing quality of the outer surface of the three-dimensional model, enhancing the structural strength of the three-dimensional model, and reducing post-processing costs; on the other hand, compared with conventional technologies in the related art where one layer of outer wall is printed followed by one layer of infill, the present application enables merged printing of a plurality of layers of infill by making the height of one layer of infill equal to that of at least two layers of outer walls, significantly reducing printing time.

Figure 3:
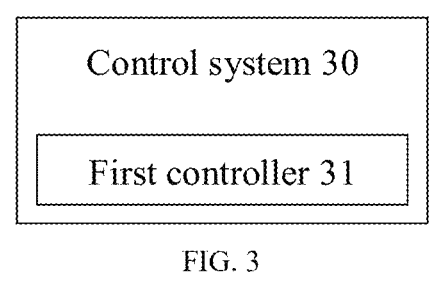

Based on the foregoing embodiments, a printer control system is further provided according to an embodiment of the present application. FIG. 3 is a schematic diagram of a structure of a printer control system provided in this embodiment of the present application. As shown in FIG. 3, the control system 30 includes a first controller 31, where the first controller is configured to: control a print head assembly of a printer to print a target outer wall set of a three-dimensional model; and control the print head assembly to print a target infill set corresponding to the target outer wall set, where the three-dimensional model includes a plurality of outer wall sets and infill sets corresponding to the outer wall sets, the target outer wall set is one of the plurality of outer wall sets and includes at least two layers of outer walls, each of the infill sets includes one or more layers of infill, and a total height of the one or more layers of infill in the target infill set is the same as that of the at least two layers of outer walls in the target outer wall set, and the number of layers contained in the target infill set is less than that contained in the target outer wall set.

Herein, the controller including the first controller and other controllers mentioned herein may be any suitable component capable of implementing the control function, for example, a microcontroller unit (MCU), a central processing unit (CPU), a digital signal processor (DSP), a field programmable gate array (FPGA), a single-chip microcomputer, etc.

The print head assembly may be any suitable assembly capable of performing printing functions. The print head assembly includes at least one nozzle. In some embodiments, the nozzle for printing the outer wall sets and the nozzle for printing the infill sets may be the same or different.

The outer wall set includes at least two layers of outer walls, where the height of each layer of outer wall may be the same or different. For the process of the first controller controlling the print head assembly to print the outer wall sets, reference may be made to the embodiments of the aforementioned step S11.

The infill set includes one or more layers of infill, where the height of each layer of infill may be either the same or different. For the process of the first controller controlling the print head assembly to print the infill sets, reference may be made to the embodiments of the aforementioned step S12.

In this embodiment of the present application, the first controller first prints an outer wall set including at least two layers of outer walls and then prints an infill set including one or more layers of infill so that: on one hand, compared with conventional technologies in the related art where the layer height of outer walls is equal to that of infill, the present application employs a smaller layer height for the outer walls than for the infill, thereby improving the printing quality of the outer surface of the three-dimensional model, enhancing the structural strength of the three-dimensional model, and reducing post-processing costs; on the other hand, compared with conventional technologies in the related art where one layer of outer wall is printed followed by one layer of infill, the present application enables merged printing of a plurality of layers of infill by making the height of one layer of infill equal to that of at least two layers of outer walls, significantly reducing printing time.

The above controller embodiment is similar to the above method embodiments in description and has similar beneficial effects as the method embodiments. For the technical details undisclosed in the controller embodiment of the present application, reference may be made to the description of the method embodiment of the present application.

In the related art, since minimal mechanical errors may exist during the installation of a print head assembly, periodic or real-time calibration of the print head assembly is required.

For a print head assembly with a plurality of nozzles, precise alignment of the plurality of nozzles in the X, Y, and Z directions must be ensured, as even minor deviations on the order of a few tenths of a millimeter may cause layer misalignment during printing, resulting in issues such as seams, overlaps, or gaps. Currently, it typically requires setting a relative offset between the plurality of nozzles in the printing software, which necessitates both accurate physical measurement of the nozzles' actual positions and precise setting of these measurements in the printing software. If the offset is incorrectly set, layer alignment cannot be maintained during nozzle switching, resulting in visible seam marks on printed objects. During actual printing operations, the requirements for calibration and alignment precision become more stringent when the nozzles operate under high-speed movement and frequent switching conditions. Any dynamic deviations may accumulate during prolonged printing processes, leading to progressive degradation of overall printing quality, thereby making maintenance and real-time adjustments non-negligible challenges.

The printer control method provided in this embodiment of the present application has the following advantages: first, it automatically detects and calibrates relative offsets and angular errors of a print head assembly along X, Y, and Z axes to prevent offset accumulation caused by mechanical installation errors, thermal expansion/contraction, and long-term use; second, it reduces operational difficulty and time costs associated with manual calibration while improving printing accuracy and printer stability; and finally, it ensures nozzle alignment consistently meets high-precision printing requirements through implementation of real-time or periodic calibration during the printing process.

Figure 4:
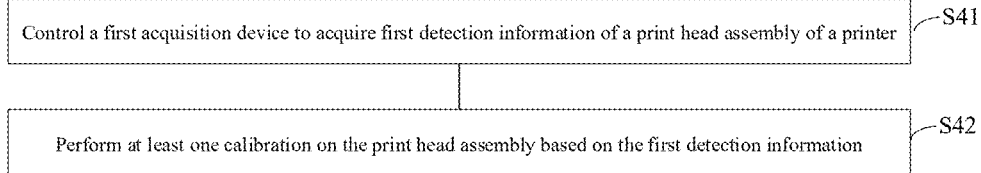
FIG. 4 is a schematic diagram of an implementation process of another printer control method provided in an embodiment of the present application.

FIG. 4 is a schematic diagram of an implementation process of another printer control method provided in an embodiment of the present application. As shown in FIG. 4, the control method includes the following steps S41 and S42.

In S41, a first acquisition device is controlled to acquire first detection information of a print head assembly of a printer.

In S42 at least one calibration is performed on the print head assembly based on the first detection information.

Herein, the first acquisition device may be any suitable device capable of acquiring information from the print head assembly. For example, the first acquisition device may be a high-resolution LiDAR camera, a binocular camera, a laser sensor, an infrared sensor, an image capture card, etc. In some embodiments, the first acquisition device may include multiple types of sensors to obtain the print head assembly's position from multiple angles, thereby improving positional detection accuracy and achieving more stable calibration.

The detection information including the first detection information and other detection information mentioned herein may include, but is not limited to, infrared information, laser information, image information, etc. During implementation, the first acquisition device may acquire the detection information periodically, in real-time, or upon receiving an acquisition instruction.

The calibration process may include, but is not limited to, preprocessing, feature extraction, and deviation compensation. Herein, preprocessing refers to performing grayscale conversion and noise reduction on the first detection information; feature extraction refers to extracting a three-dimensional position and calibration point information of a nozzle using algorithms such as template matching, edge detection, or deep learning; and deviation compensation refers to automatically adjusting a coordinate reference or correcting a printing path based on a compensation parameter, which is determined according to a deviation corresponding to the print head assembly. The deviation corresponding to the print head assembly may include, but is not limited to, a positional deviation or an angular deviation. For example, the calibration process may include feature extraction+deviation compensation. As another example, the calibration process may include preprocessing+feature extraction+deviation compensation.

In some embodiments, after completing a calibration of the print head assembly, a post-compensation validation may be performed on the calibrated print head assembly. The post-compensation validation refers to validating the print head assembly following deviation compensation to determine whether the deviation corresponding to the print head assembly falls within a preset deviation range. If the deviation corresponding to the print head assembly falls within the preset deviation range, the printer may be switched to a ready state for printing operations; and if the deviation corresponding to the print head assembly exceeds the preset deviation range, recalibration is required until the deviation corresponding to the print head assembly falls within the preset deviation range before switching the printer to the ready state. The preset deviation range may be any suitable range and, during implementation, may be configured according to factors such as the printer's printing precision, the first acquisition device's sensitivity, and the first acquisition device's accuracy, which is not limited in this embodiment of the present application.

In some embodiments, calibration of the print head assembly may be performed either prior to printing or during nozzle switching within the print head assembly.

In some embodiments, an adjustable fine-tuning mechanism may be further incorporated at the print head assembly's installation position for automatic calibration of the print head assembly, where the fine-tuning mechanism achieves preliminary alignment through physical adjustment before subsequent software calibration via the steps S41 and S42 to enhance precision.

In some embodiments, a dimensional deviation of an initial print sample may be analyzed to automatically correct a printing path based on the deviation, thereby indirectly correcting nozzle alignment issues.

In this embodiment of the present application, the first acquisition device is controlled to acquire the first detection information of the print head assembly of the printer; and at least one calibration is performed on the print head assembly based on the first detection information. In this way, through automatic detection and calibration of the print head assembly: firstly, automated calibration is achieved, which not only reduces manual calibration while improving production efficiency, but also decreases the likelihood of offset accumulation caused by mechanical installation errors, thermal expansion/contraction, and long-term use, thereby reducing the possibility of printing layer misalignment-induced defects such as seams, overlaps, and gaps, consequently enhancing printing accuracy and printer stability; secondly, real-time compensation of nozzle position errors during the calibration process ensures consistent layer precision during multi-material and multi-color printing, significantly improving print quality while guaranteeing that printing results meet high-precision requirements; finally, the first acquisition device can be integrated into existing FDM printers, demonstrating good compatibility and upgradability.

In some embodiments, the step S42 includes the following steps S421 to S423.

In S421, one calibration is performed on the print head assembly based on the first detection information.

In S422, the first acquisition device is controlled to acquire second detection information of the print head assembly.

In S423, the printer is switched to a ready state in a case that the second detection information indicates that the deviation of the print head assembly falls within the preset deviation range.

Herein, one calibration may include, but is not limited to, preprocessing, feature extraction, and deviation compensation. During implementation, the first detection information may first undergo preprocessing to obtain target first detection information; then, algorithms such as template matching, edge detection, or deep learning may be applied to extract a three-dimensional position and calibration point information of a nozzle from the target first detection information; subsequently, deviation information of the nozzle may be calculated based on the three-dimensional position and the calibration point information; finally, a compensation parameter may be computed according to the nozzle's deviation information, followed by automatically adjusting a coordinate reference or correcting a printing path based on the compensation parameter.

The second detection information may include, but is not limited to, infrared information, laser information, image information, etc. During implementation, after performing one calibration on the print head assembly, the first acquisition device may be controlled to further acquire second detection information of the print head assembly, so as to perform post-compensation validation of the print head assembly based on the second detection information. During implementation, if the deviation corresponding to the print head assembly exceeds the preset deviation range, recalibration is required until the deviation corresponding to the print head assembly falls within the preset deviation range;

if the deviation corresponding to the print head assembly falls within the preset deviation range, the printer is switched to a ready state.

For example, take a print head assembly including a first nozzle and a second nozzle as an example to illustrate the whole calibration process.

(1) A printer is switched to the first nozzle and a zeroing operation is performed on the mechanical coordinates X, Y, and Z of the printer, where a LiDAR camera (corresponding to the aforementioned first acquisition device) acquires first detection information of the first nozzle (including three-dimensional images and laser data); then, switching the printer to the second nozzle, where the LiDAR camera acquires first detection information of the second nozzle (including three-dimensional images and laser data).

(2) Preprocessing such as grayscale conversion and noise filtering is performed on the first detection information of the first nozzle and on the first detection information of the second nozzle.

(3) Algorithms including template matching, edge detection, and deep learning are applied to perform feature extraction on preprocessed first detection information of the first nozzle to obtain a three-dimensional position of the first nozzle and calibration point information of the first nozzle, and feature extraction is performed on preprocessed first detection information of the second nozzle to obtain a three-dimensional position of the second nozzle and calibration point information of the second nozzle.

(4) A deviation of a true center of the first nozzle in the first detection information of the first nozzle is determined according to the three-dimensional position of the first nozzle and the calibration point information of the first nozzle, and a deviation of a true center of the second nozzle in the first detection information of the second nozzle is determined according to the three-dimensional position of the second nozzle and the calibration point information of the second nozzle.

(5) A compensation parameter for the first nozzle is determined according to the deviation of the true center of the first nozzle, and a compensation parameter for the second nozzle is determined according to the deviation of the true center of the second nozzle; a coordinate reference of a motion control system of the printer is automatically adjusted or a printing path is directly corrected according to the compensation parameters for both the first nozzle and the second nozzle, thereby ensuring that materials extruded by both the first nozzle and the second nozzle are accurately superimposed in physical position during printing; and when it is subsequently switched to the second nozzle, an offset of the global mechanical coordinates X, Y, and Z is set to be the deviation of the true center of the second nozzle minus the deviation of the true center of the first nozzle.

(6) After adjustment, the LiDAR camera is reactivated to acquire second detection information of the first nozzle and second detection information of the second nozzle, so as to verify calibration effectiveness based on the second detection information of the first nozzle and the second detection information of the second nozzle until the deviation corresponding to the first nozzle and the deviation corresponding to the second nozzle are controlled within the preset deviation range, whereupon a printing task is resumed.

In these embodiments of the present application, one calibration is performed on the print head assembly based on the first detection information; the first acquisition device is controlled to further acquire second detection information of the print head assembly; and in a case that the second detection information indicates that the deviation corresponding to the print head assembly falls within the preset deviation range, the printer is switched to a ready state. In this way, post-calibration deviation validation is performed on the calibrated print head assembly to ensure actual calibration effectiveness, which not only reduces the likelihood of error re-accumulation due to prolonged use or environmental changes, but also establishes closed-loop management by integrating calibration with validation, simultaneously guaranteeing immediate printing quality correction while maintaining equipment performance stability, ultimately achieving comprehensive optimization of efficiency, cost, and compliance.

In some embodiments, in a case that the second detection information indicates that the deviation of the print head assembly exceeds the preset deviation range, the control method further includes the following steps S424 and S425.

In S424, the first acquisition device is controlled to acquire next first detection information of the print head assembly.

In S425, at least one calibration is performed on the print head assembly based on the next first detection information.

Herein, the next first detection information refers to the first detection information acquired in a next acquisition, where an acquisition method of the next first detection information may be the same as or different from that of the first detection information. For example, when the first acquisition device includes one camera, both the first detection information and the next first detection information may be acquired through the camera. As another example, when the first acquisition device includes two cameras, the first detection information may be acquired through one camera while the next first detection information may be acquired through the other camera.

Since the deviation corresponding to the print head assembly exceeds the preset deviation range, recalibration of the print head assembly is required, and reference may be made to the embodiments of the aforementioned step S42 for the process of performing the recalibration on the print head assembly based on the next first detection information.

In these embodiments of the present application, when deviation validation fails, the print head assembly undergoes recalibration, which may further eliminate residual minor errors (e.g., nozzle misalignment or extrusion volume deviations) that may persist after the previous calibration. In this way, it not only prevents stair-stepping artifacts or dimensional inaccuracies caused by inconsistent layer thickness, but also maintains surface flatness and interlayer bonding strength, thereby ensuring both printing output precision and equipment operation reliability.

In some embodiments, the print head assembly further includes a first nozzle and a second nozzle, and the control method further includes the following steps S431 to S434.

In S431, in response to detecting a nozzle switching instruction, the first acquisition device is controlled to acquire third detection information of an active nozzle, where the active nozzle is selected from the first nozzle or the second nozzle.

In S432, another nozzle of the first nozzle or the second nozzle is switched to the active nozzle.

In S433, the first acquisition device is controlled to acquire fourth detection information of the active nozzle.

In S434, at least one calibration is performed on the active nozzle based on the third detection information and the fourth detection information.

Herein, the nozzle switching instruction may be any suitable instruction capable of implementing nozzle switching. A generation method of the nozzle switching instruction may be any suitable method, for example, an automatically generated nozzle switching instruction during printing, or a user-set nozzle switching instruction.

The third detection information and the fourth detection information may include, but are not limited to, infrared information, laser information, image information, etc.

During implementation, when a current active nozzle is the first nozzle: if a next active nozzle remains the first nozzle, nozzle switching is unnecessary, and validation may or may not be performed on the first nozzle; if the next active nozzle is the second nozzle, then after switching from the first nozzle to the second nozzle, validation must be performed on the second nozzle. Similarly, when a current active nozzle is the second nozzle: if a next active nozzle remains the second nozzle, nozzle switching is unnecessary, and validation may or may not be performed on the second nozzle; if the next active nozzle is the first nozzle, then after switching from the second nozzle to the first nozzle, validation must be performed on the first nozzle.

When switching nozzles in the print head assembly, calibration of the switched-to nozzle is required to enhance precision of subsequent operations. The calibration process may include, but is not limited to, preprocessing, feature extraction, and deviation compensation.

During implementation, an initial calibration of the active nozzle may first be performed based on the third detection information and the fourth detection information with reference to the embodiments of the aforementioned step S42. After completing the initial calibration, post-compensation validation of the active nozzle's calibration is conducted to ensure a deviation corresponding to the active nozzle falls within a deviation range of the active nozzle. If the deviation corresponding to the active nozzle falls within the deviation range, the printer may be switched to a ready state for printing operations; and if the deviation corresponding to the active nozzle exceeds the deviation range, recalibration is required until the deviation corresponding to the active nozzle falls within the deviation range before switching the printer to the ready state. The deviation ranges of different active nozzles may be the same or different.

In these embodiments of the present application, in response to detecting a nozzle switching instruction, the first acquisition device is controlled to acquire third detection information of an active nozzle, where the active nozzle includes either the first nozzle or the second nozzle; another nozzle is switched to the active nozzle; the first acquisition device is controlled to acquire fourth detection information of the active nozzle; and at least one calibration is performed on the active nozzle based on both the third detection information and the fourth detection information. In this way, when switching nozzles, by dynamically monitoring and calibrating the active nozzle, mechanical deviations caused by temperature changes or prolonged use can be overcome, which not only improves printing stability and reliability, but also enhances equipment durability.

In some embodiments, the step S434 includes the following steps S4341 to S4343.

In S4341, one calibration is performed on the active nozzle based on the third detection information and the fourth detection information.

In S4342, the first acquisition device is controlled to acquire next fourth detection information of the active nozzle.

In S4343, the printer is switched to a ready state in a case that the next fourth detection information indicates that the deviation of the active nozzle falls within the preset deviation range.

Herein, one calibration may include, but is not limited to, preprocessing, feature extraction, and deviation compensation. For the process of calibrating the active nozzle, reference may be made to the embodiments of the aforementioned step S42.

The next fourth detection information refers to the fourth detection information acquired in a next acquisition, where an acquisition method of the next fourth detection information may be the same as or different from that of the fourth detection information. For example, when the first acquisition device includes one camera, both the fourth detection information and the next fourth detection information may be acquired through the camera. As another example, when the first acquisition device includes two cameras, the fourth detection information may be acquired through one camera while the next fourth detection information may be acquired through the other camera.

During implementation, if the deviation corresponding to the active nozzle exceeds the deviation range, recalibration is required until the deviation corresponding to the active nozzle falls within the deviation range; if the deviation corresponding to the active nozzle falls within the deviation range, the printer is switched to a ready state.

In these embodiments of the present application, post-calibration deviation validation is performed on the calibrated active nozzle to ensure actual calibration effectiveness, which not only reduces the likelihood of error re-accumulation due to prolonged use or environmental changes, but also establishes closed-loop management by integrating calibration with validation, simultaneously guaranteeing immediate printing quality correction while maintaining equipment performance stability, ultimately achieving comprehensive optimization of efficiency, cost, and compliance.

In some embodiments, when the next fourth detection information indicates that the deviation of the active nozzle exceeds the deviation range, the control method further includes the following step S4344.

In S4344, at least one calibration is performed on the active nozzle based on both the third detection information and the next fourth detection information.

Herein, since the deviation corresponding to the active nozzle exceeds the deviation range of the active nozzle, recalibration of the active nozzle is required. For the process of performing the recalibration on the active nozzle based on the next fourth detection information and the third detection information, reference may be made to the embodiments of the aforementioned step S4341.

In these embodiments of the present application, when deviation validation fails, the active nozzle undergoes recalibration, which may further eliminate residual minor errors (e.g., nozzle misalignment or extrusion volume deviations) that may persist after the previous calibration. In this way, it not only prevents stair-stepping artifacts or dimensional inaccuracies caused by inconsistent layer thickness, but also maintains surface flatness and interlayer bonding strength, thereby ensuring both printing output precision and equipment operation reliability.

Figure 5:
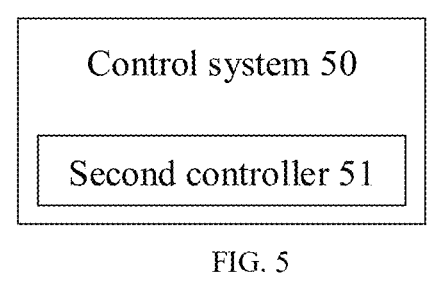

Based on the foregoing embodiments, a printer control system is further provided according to an embodiment of the present application. FIG. 5 is a schematic diagram of a structure of another printer control system provided in this embodiment of the present application. As shown in FIG. 5, the control system 50 includes a second controller 51, where the second controller is configured to: control a first acquisition device to acquire first detection information of a print head assembly of a printer; and perform at least one calibration on the print head assembly based on the first detection information.

Herein, the second controller may be any suitable component capable of implementing the control function, for example, an MCU, a CPU, a DSP, an FPGA, a single-chip microcomputer, etc. During implementation, the second controller and the first controller may be the same or different.

The first acquisition device may be any suitable device capable of acquiring information from the print head assembly. For example, the first acquisition device may be a high-resolution LiDAR camera, a binocular camera, a laser sensor, an infrared sensor, an image capture card, etc.

The first detection information may include, but is not limited to, infrared information, laser information, image information, etc. During implementation, for the process of the second controller controlling the first acquisition device to acquire the first detection information, reference may be made to the embodiments of the aforementioned step S41.

The calibration process may include, but is not limited to, preprocessing, feature extraction, and deviation compensation. During implementation, for the process of the second controller controlling the calibration of the print head assembly, reference may be made to the embodiments of the aforementioned step S42.

In some embodiments, after completing one calibration of the print head assembly, the second controller may further control a post-compensation validation of the calibrated print head assembly.

Figure 6:
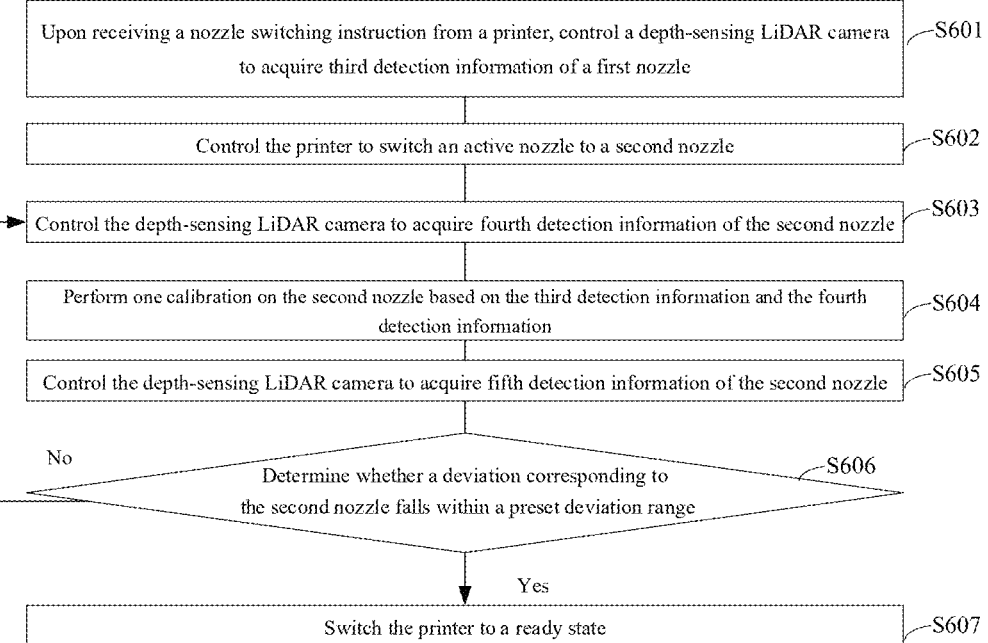
FIG. 6 is a schematic diagram of an implementation process of yet another printer control method provided in an embodiment of the present application.

FIG. 6 is a schematic diagram of an implementation process of yet another printer control method provided in an embodiment of the present application. As shown in FIG. 6, the control method includes the following steps S601 to S607.

In S601, upon receiving a nozzle switching instruction from a printer, a depth-sensing LiDAR camera (corresponding to the aforementioned first acquisition device) is controlled to acquire third detection information of a first nozzle.

In S602, the printer is controlled to switch an active nozzle to a second nozzle.

In S603, the depth-sensing LiDAR camera is controlled to acquire fourth detection information of the second nozzle.

In S604, one calibration is performed on the second nozzle based on the third detection information and the fourth detection information.

In S605, the depth-sensing LiDAR camera is controlled to acquire fifth detection information of the second nozzle.

In S606, whether a deviation corresponding to the second nozzle falls within a preset deviation range is determined: if yes, proceeding to the following step S607; if no, returning to the step S603.

In S607, the printer is switched to a ready state.

In this embodiment of the present application, through automatic detection and calibration of the print head assembly: firstly, automated calibration is achieved, which not only reduces manual calibration while improving production efficiency, but also decreases the likelihood of offset accumulation caused by mechanical installation errors, thermal expansion/contraction, and long-term use, thereby reducing the possibility of printing layer misalignment-induced defects such as seams, overlaps, and gaps, consequently enhancing printing accuracy and printer stability; secondly, real-time compensation of nozzle position errors during the calibration process ensures consistent layer precision during multi-material and multi-color printing, significantly improving print quality while guaranteeing that printing results meet high-precision requirements; finally, the first acquisition device can be integrated into existing FDM printers, demonstrating good compatibility and upgradability.

The above controller embodiment is similar to the above method embodiments in description and has similar beneficial effects as the method embodiments. For the technical details undisclosed in the controller embodiment of the present application, reference may be made to the description of the method embodiment of the present application.

It should be noted that in the embodiments of the present application, if the method described above is implemented in the form of a software function module and sold or used as independent products, they can also be stored in a computer-readable storage medium. Based on such understanding, the technical solutions of the embodiments of the present application may essentially, or the portion contributing to the related art may, be embodied in the form of a software product. The software product is stored in a storage medium and includes several instructions configured to cause an electronic device (which may be a personal computer, a server, a network device, or the like) to execute all or part of the method described in each embodiment of the present application. The foregoing storage medium includes various media that can store program code, such as a USB flash drive, a removable hard disk, a read-only memory (ROM), a magnetic disk, or an optical disc. Thus, the embodiments of the present application are not limited to any specific combination of hardware and software.

An embodiment of the present application provides a printer, including a processor and a memory storing a computer program executable on the processor, where the processor, when executing the computer program, implements the method described above.

An embodiment of the present application provides a computer-readable storage medium having a computer program stored thereon, where the computer program, when executed by a processor, implements the method described above. The computer-readable storage medium may be transitory or non-transitory.

An embodiment of the present application provides a computer program product, including a non-transitory computer-readable storage medium storing a computer program, where the computer program, when read and executed by a computer, implements some or all steps of the aforementioned method. The computer program product may be specifically implemented through hardware, software, or a combination thereof. In one optional embodiment, the computer program product is specifically embodied as a computer storage medium; in another optional embodiment, the computer program product is specifically embodied as a software product, such as a software development kit (SDK) and the like.

Figure 7:
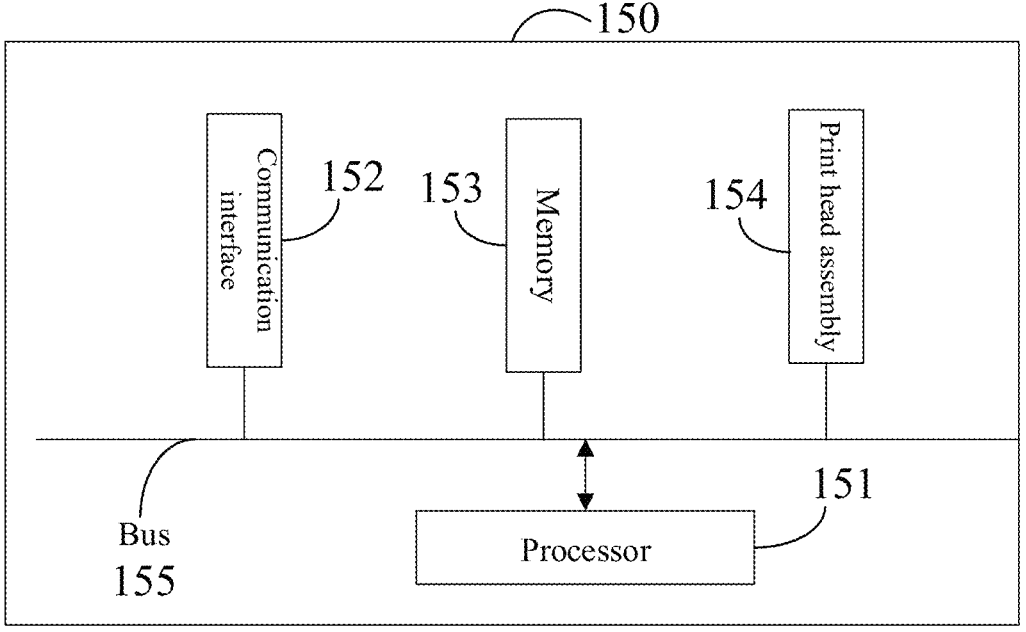
FIG. 7 is a schematic diagram of a hardware entity of a printer provided in an embodiment of the present application.

It should be noted that FIG. 7 is a schematic diagram of a hardware entity of a printer provided in an embodiment of the present application. As shown in FIG. 7, the hardware entity of printer 150 includes: a processor 151, a communication interface 152, a memory 153, and a print head assembly 154.

The processor 151 typically controls overall operations of the printer 150.

The communication interface 152 enables the printer 150 to communicate with other terminals or servers via a network.

The memory 153 is configured to store instructions and applications executable by the processor 151, and may also cache data to be processed or already processed by the processor 151 and various modules of the printer 150 (e.g., image data, audio data, voice communication data, and video communication data). It may be implemented through a flash memory (FLASH) or random access memory (RAM); and data transmission between the processor 151, the communication interface 152, the memory 153, and the print head assembly 154 may be performed via a bus 155.

It should be noted that the above storage medium and device embodiments are similar to the above method embodiments in description and have similar beneficial effects as the method embodiments. For technical details not disclosed in the storage medium and device embodiments of the present application, reference may be made to the description of the method embodiments of the present application.

It should be understood that "one embodiment" or "an embodiment" mentioned in the specification means that specific features, structures, or characteristics related to the embodiment are included in at least one embodiment of the present application. Therefore, "in one embodiment" or "in an embodiment" appearing in various places of the specification does not necessarily refer to the same embodiment. In addition, these specific features, structures, or characteristics may be combined in one or more embodiments in any suitable manner. It should be understood that the serial number of each step of various embodiments of the present application does not indicate the execution sequence, which should be determined by the function and internal logic of the step, and shall not limit the implementation of the embodiments of the present application. The serial numbers of the foregoing embodiments of the present application are only for the purpose of description and do not imply a preference among the embodiments.

The above merely describes the embodiments of the present application, but the protection scope of the present application is not limited thereto. Any changes or replacements that can be easily thought by those skilled in the art within the scope of disclosure of the present application should fall within the protection scope of the present application.

What is claimed is:

1. A printer control method, comprising:
controlling a print head assembly of a printer to print a target outer wall set of a three-dimensional model, wherein the three-dimensional model comprises a plurality of outer wall sets and infill sets corresponding to the outer wall sets, the target outer wall set is one of the plurality of outer wall sets and comprises at least two layers of outer walls, and each of the infill sets comprises one or more layers of infill; and
controlling the print head assembly to print a target infill set corresponding to the target outer wall set, wherein a total height of the one or more layers of infill in the target infill set is the same as that of the at least two layers of outer walls in the target outer wall set, and the number of layers contained in the target infill set is less than that contained in the target outer wall set; wherein the three-dimensional model comprises at least one section, and for each of the outer wall sets, the height of each layer of outer walls is determined based on a section of the at least one section corresponding to the outer wall set; wherein one section of the at least one section corresponds to a plurality of outer wall sets, and the layers of outer walls in each outer wall set are stacked along a height direction and correspond to different height positions on an outer surface of the three-dimensional model; wherein the section corresponding to the outer wall set comprise a plurality of triangles, and the heights of the at least two layers of outer walls in the outer wall set are determined based on a target angle between a normal vector of a target triangle in the section corresponding to the outer wall set and a target direction, with the target direction being perpendicular to the section corresponding to the outer wall set; wherein for each of the at least two layers of outer walls in the target outer wall set, adjusting a height of a first target nozzle to a height corresponding to the outer wall and controlling the first target nozzle to print the outer wall;

wherein before controlling the print head assembly of the printer to print the target outer wall set of the three-dimensional model, the control method further comprises:

controlling a first acquisition device to acquire first detection information of the print head assembly of the printer, wherein the print head assembly comprises a first nozzle and a second nozzle, and the first detection information is used to determine a position of the first nozzle and a position of the second nozzle;

performing at least one calibration on the print head assembly based on the first detection information, wherein the calibration comprises adjusting a coordinate reference of the print head assembly and/or adjusting a position of the print head assembly based on a deviation of the print head assembly in a case that the deviation exceeds a preset deviation range, wherein the deviation of the print head assembly is determined based on the position of the first nozzle and the position of the second nozzle;

controlling the first acquisition device to acquire second detection information of the print head assembly after the calibration; and switching the printer to a ready state or resuming a printing task in a case that the second detection information indicates that the deviation of the print head assembly falls within the preset deviation range.

2. The control method of claim 1, controlling the print head assembly of the printer to print the target outer wall set of the three-dimensional model comprises controlling the first target nozzle to print the target outer wall set, wherein the first target nozzle is selected from the first nozzle or the second nozzle; and controlling the print head assembly to print the target infill set corresponding to the target outer wall set comprises controlling a second target nozzle to print the target infill set corresponding to the target outer wall set, wherein the second target nozzle is selected from the first nozzle or the second nozzle.

3. The control method of claim 2, wherein controlling the second target nozzle to print the target infill set corresponding to the target outer wall set comprises:

for each of the one or more layers of infill in the target infill set, adjusting a height of the second target nozzle to a height corresponding to the infill and controlling the second target nozzle to print the infill.

4. The control method of claim 2, wherein determining the first target nozzle based on characteristics of the first nozzle, characteristics of the second nozzle, and heights of the at least two layers of outer walls in the target outer wall set; and determining the second target nozzle based on the characteristics of the first nozzle, the characteristics of the second nozzle, and heights of the one or more layers of infill in the target infill set, wherein the characteristics of the first nozzle comprise at least one of the following: a diameter of the first nozzle, a color of a filament in the first nozzle, or a type of the filament in the first nozzle; and the characteristics of the second nozzle comprise at least one of the following: a diameter of the second nozzle, a color of a filament in the second nozzle, or a type of the filament in the second nozzle.

5. The control method of claim 2, wherein the control method further comprises:

for each of the at least two layers of outer walls in the target outer wall set, determining a first control parameter corresponding to a height of the outer wall, and controlling the first target nozzle to extrude a filament according to the first control parameter to print the outer wall; and for each of the one or more layers of infill in the target infill set, determining a second control parameter corresponding to a height of the infill, and controlling the second target nozzle to extrude the filament according to the second control parameter to print the infill.

6. The control method of claim 5, wherein the first control parameter comprises at least one of a first temperature or a first flow rate; and the second control parameter comprises at least one of a second temperature or a second flow rate.

7. The control method of claim 1, wherein the heights of the at least two layers of outer walls in the outer wall set are the same.

8. The control method of claim 1, wherein the heights of the at least two layers of outer walls in the outer wall set are determined based on the target angle and a maximum surface deviation, wherein the maximum surface deviation is determined based on printing parameters of the printer, and the printing parameters comprise a layer height and a target ratio between a printing detail and a printing speed; or, the maximum surface deviation is determined by a target interpolation function, wherein a parameter in the target interpolation function is determined based on a layer height and a target ratio between a printing detail and a printing speed.

9. The control method of claim 1, wherein the heights of the at least two layers of outer walls in the outer wall set are directly proportional to the target angle.

10. The control method of claim 1, wherein for each of the plurality of outer wall sets, the number of layers contained in the outer wall set is determined based on a diameter of the print head assembly and heights of the at least two layers of outer walls in the outer wall set; and for each of the infill sets, the number of layers contained in the infill set and heights of the one or more layers of infill in the infill set are determined based on an outer wall set of the plurality of outer wall sets corresponding to the infill set.

11. The control method of claim 1, wherein the control method further comprises:

controlling the print head assembly of the printer to print a target inner wall set of the three-dimensional model, wherein the three-dimensional model further comprises one or more layers of inner walls, each of the inner walls corresponds to at least two inner wall sets, and the at least two inner wall sets are located between the outer wall sets and the infill sets and configured to support the outer wall sets and connect the infill sets; and controlling the print head assembly to print the target outer wall set corresponding to the target inner wall set.

12. A non-transitory computer-readable storage medium having a computer program stored thereon, wherein the computer program, when executed by a processor, implements a printer control method comprising:

controlling a print head assembly of a printer to print a target outer wall set of a three-dimensional model, wherein the three-dimensional model comprises a plurality of outer wall sets and infill sets corresponding to the outer wall sets, the target outer wall set is one of the plurality of outer wall sets and comprises at least two layers of outer walls, and each of the infill sets comprises one or more layers of infill; and controlling the print head assembly to print a target infill set corresponding to the target outer wall set, wherein a total height of the one or more layers of infill in the target infill set is the same as that of the at least two layers of outer walls in the target outer wall set, and the number of layers contained in the target infill set is less than that contained in the target outer wall set; wherein the three-dimensional model comprises at least one section, and for each of the outer wall sets, the height of each layer of outer walls is determined based on a section of the at least one section corresponding to the outer wall set; wherein one section of the at least one section corresponds to a plurality of outer wall sets, and the layers of outer walls in each outer wall set are stacked along a height direction and correspond to different height positions on an outer surface of the three-dimensional model; wherein the section corresponding to the outer wall set comprise a plurality of triangles, and the heights of the at least two layers of outer walls in the outer wall set are determined based on a target angle between a normal vector of a target triangle in the section corresponding to the outer wall set and a target direction, with the target direction being perpendicular to the section corresponding to the outer wall set; wherein for each of the at least two layers of outer walls in the target outer wall set, adjusting a height of a first target nozzle to a height corresponding to the outer wall and controlling the first target nozzle to print the outer wall;

wherein before controlling the print head assembly of the printer to print the target outer wall set of the three-dimensional model, the control method further comprises:

controlling a first acquisition device to acquire first detection information of the print head assembly of the printer, wherein the print head assembly comprises a first nozzle and a second nozzle, and the first detection information is used to determine a position of the first nozzle and a position of the second nozzle;

performing at least one calibration on the print head assembly based on the first detection information, wherein the calibration comprises adjusting a coordinate reference of the print head assembly and/or adjusting a position of the print head assembly based on a deviation of the print head assembly in a case that the deviation exceeds a preset deviation range, wherein the deviation of the print head assembly is determined based on the position of the first nozzle and the position of the second nozzle;

controlling the first acquisition device to acquire second detection information of the print head assembly after the calibration; and switching the printer to a ready state or resuming a printing task in a case that the second detection information indicates that the deviation of the print head assembly falls within the preset deviation range.

* * * * *